United States Patent
Ito

(10) Patent No.: US 8,627,181 B1
(45) Date of Patent: Jan. 7, 2014

(54) STORAGE APPARATUS, STORAGE CONTROLLER, AND METHOD FOR MANAGING LOCATIONS OF ERROR CORRECTING CODE BLOCKS IN ARRAY

(71) Applicants: Kabushiki Kaisha Toshiba, Tokyo (JP); Toshiba Solutions Corporation, Tokyo (JP)

(72) Inventor: Tatsuya Ito, Tama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 0 days.

(21) Appl. No.: 13/826,205

(22) Filed: Mar. 14, 2013

Related U.S. Application Data

(63) Continuation of application No. PCT/JP2012/073339, filed on Sep. 12, 2012.

(51) Int. Cl.
*G11C 29/00* (2006.01)

(52) U.S. Cl.
USPC ........................................... 714/773

(58) Field of Classification Search
USPC ........................................... 714/773
See application file for complete search history.

(56) References Cited

U.S. PATENT DOCUMENTS

| | | | | |
|---|---|---|---|---|
| 5,548,711 | A | * | 8/1996 | Brant et al. ................... 714/5.11 |
| 5,911,779 | A | * | 6/1999 | Stallmo et al. ................ 714/6.12 |
| 2010/0005228 | A1 | | 1/2010 | Fukutomi et al. |
| 2010/0057988 | A1 | | 3/2010 | Okamoto et al. |
| 2012/0005402 | A1 | | 1/2012 | Yamamoto et al. |

FOREIGN PATENT DOCUMENTS

| | | |
|---|---|---|
| JP | 2010-15516 | 1/2010 |
| JP | 2010/55247 | 3/2010 |
| JP | 2012-14415 | 1/2012 |
| WO | WO 2011/010344 A1 | 1/2011 |

* cited by examiner

*Primary Examiner* — Albert Decady
*Assistant Examiner* — Enam Ahmed
(74) *Attorney, Agent, or Firm* — Finnegan, Henderson, Farabow, Garrett & Dunner, LLP

(57) ABSTRACT

According to one embodiment, a storage controller of a storage apparatus includes an array management unit managing an array. The array includes a plurality of stripe groups. A set of an error correcting code block and a plurality of data blocks is arranged in each of the plurality of stripe groups. Each of the plurality of stripe groups includes a set of stripe blocks of which physical positions correspond to each other in the plurality of solid state drives. The array management unit regularly arranges the error correcting code blocks and the data blocks in the plurality of stripe groups such that the numbers of the arranged error correcting code blocks are non-uniform among the plurality of solid state drives.

20 Claims, 13 Drawing Sheets

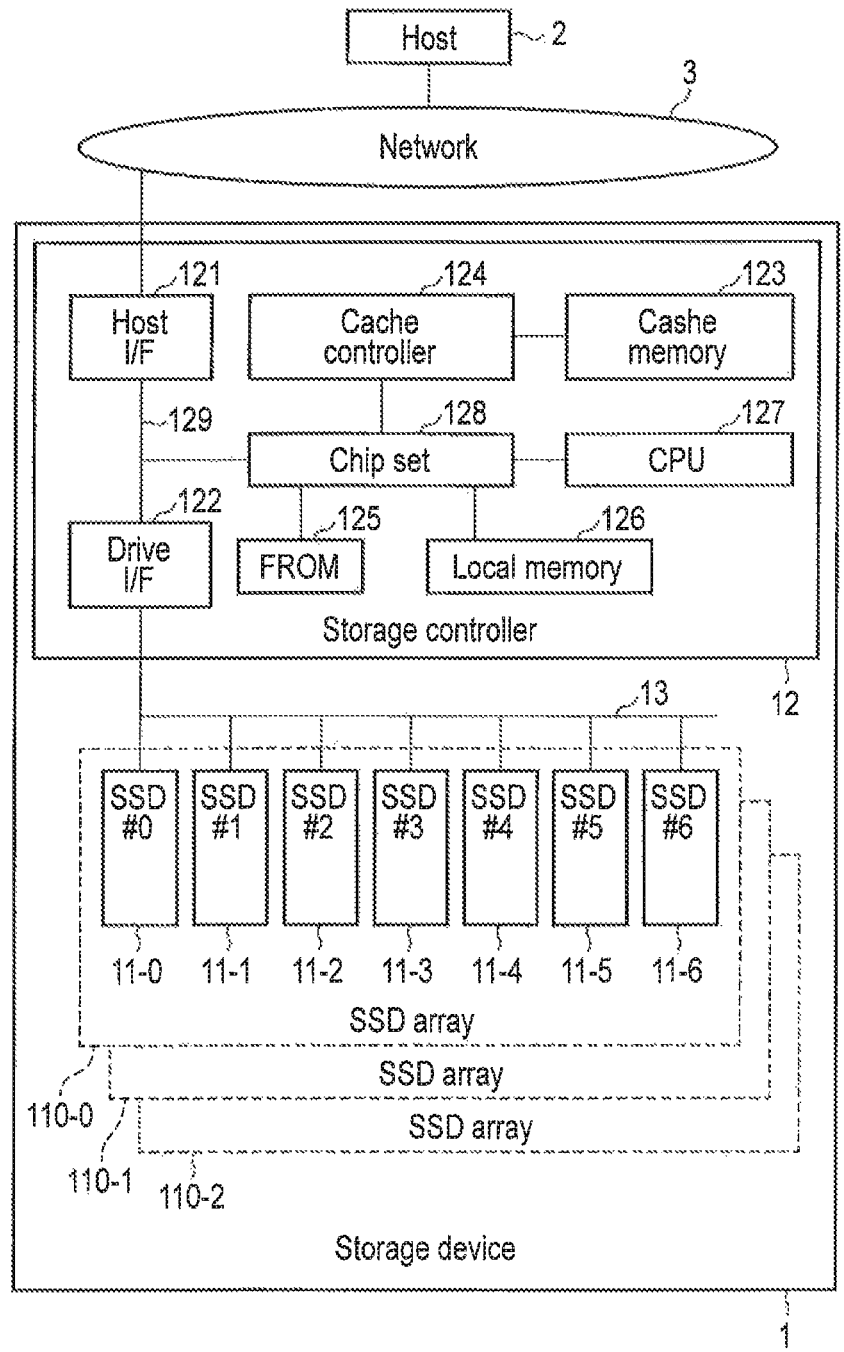
F I G. 1

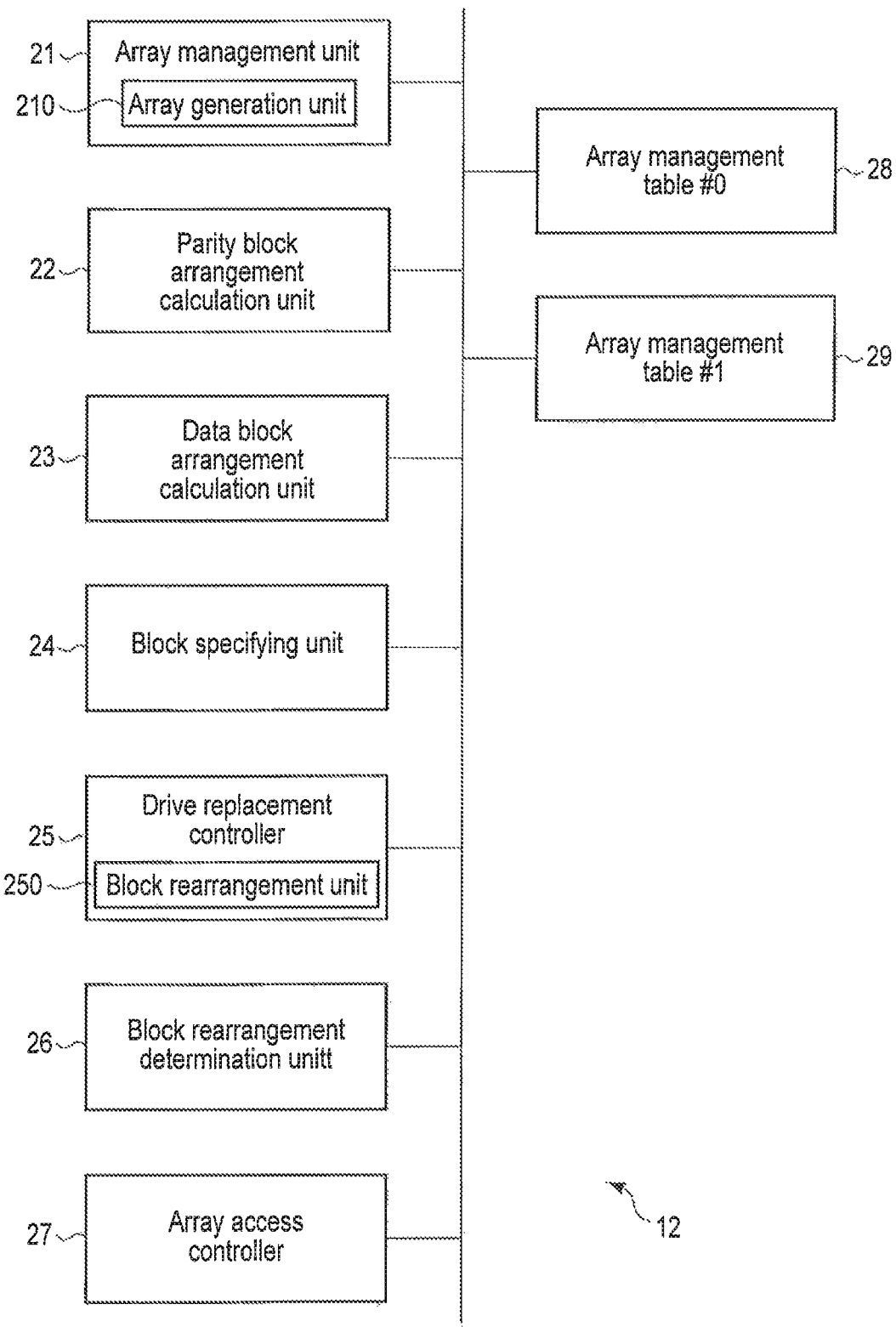
F I G. 2

| Stripe group number | SSD-#0 | SSD-#1 | SSD-#2 | SSD-#3 | SSD-#4 | SSD-#5 | SSD-#6 |
|---|---|---|---|---|---|---|---|
| 0 | P | D0 | D1 | D2 | D3 | D4 | D5 |
| 1 | D0 | P | D1 | D2 | D3 | D4 | D5 |
| 2 | D0 | D1 | P | D2 | D3 | D4 | D5 |
| 3 | D0 | D1 | D2 | P | D3 | D4 | D5 |
| 4 | D0 | D1 | D2 | D3 | P | D4 | D5 |
| 5 | D0 | D1 | D2 | D3 | D4 | P | D5 |
| 6 | D0 | D1 | D2 | D3 | D4 | D5 | P |
| 7 | P | D0 | D1 | D2 | D3 | D4 | D5 |
| 8 | D0 | P | D1 | D2 | D3 | D4 | D5 |
| 9 | D0 | D1 | P | D2 | D3 | D4 | D5 |
| 10 | D0 | D1 | D2 | P | D3 | D4 | D5 |
| 11 | D0 | D1 | D2 | D3 | P | D4 | D5 |
| 12 | D0 | D1 | D2 | D3 | D4 | P | D5 |
| 13 | D0 | D1 | D2 | D3 | D4 | D5 | P |
| : | : | : | : | : | : | : | : |

FIG. 3

| | | |
|---|---|---|
| Number of drives in array (drv_num) | 7 | |
| Stripe size (sb_sz) | 1MB | |
| Stripe group size (sg_sz) | 1MB×(7-1)=6MB | |
| Management block size (blk_sz) | drv_num(drv_num-1)/2=21 | |
| Management block boundary offset (bdr-ofs) | 0 | |
| PR block boundary offset | 0 | |
| R stripe group number (realoc_no) | No execution of rearrangement | |
| R drive slot number | No execution of rearrangement | |

| Drive slot number | SSD-#0 | SSD-#1 | SSD-#2 | SSD-#3 | SSD-#4 | SSD-#5 | SSD-#6 |
|---|---|---|---|---|---|---|---|
| Drive member number | 0 | 1 | 2 | 3 | 4 | 5 | 6 |
| PR member number | 0 | 1 | 2 | 3 | 4 | 5 | 6 |

FIG. 4

| Drive slot number | SSD-#0 | SSD-#1 | SSD-#2 | SSD-#3 | SSD-#4 | SSD-#5 | SSD-#6 |
|---|---|---|---|---|---|---|---|
| Drive member number | 0 | 1 | 2 | 3 | 4 | 5 | 6 |
| PR member number | 0 | 1 | 2 | 3 | 4 | 5 | 6 |
| Stripe group number | | | | | | | |
| 0 | P | D0 | D1 | D2 | D3 | D4 | D5 |
| 1 | D5 | P | D0 | D1 | D2 | D3 | D4 |
| 2 | D4 | D5 | P | D0 | D1 | D2 | D3 |
| 3 | D3 | D4 | D5 | P | D0 | D1 | D2 |
| 4 | D2 | D3 | D4 | D5 | P | D0 | D1 |
| 5 | D1 | D2 | D3 | D4 | D5 | P | D0 |
| 6 | P | D0 | D1 | D2 | D3 | D4 | D5 |
| 7 | D5 | P | D0 | D1 | D2 | D3 | D4 |
| 8 | D4 | D5 | P | D0 | D1 | D2 | D3 |
| 9 | D3 | D4 | D5 | P | D0 | D1 | D2 |
| 10 | D2 | D3 | D4 | D5 | P | D0 | D1 |
| 11 | P | D0 | D1 | D2 | D3 | D4 | D5 |
| 12 | D5 | P | D0 | D1 | D2 | D3 | D4 |
| 13 | D4 | D5 | P | D0 | D1 | D2 | D3 |
| 14 | D3 | D4 | D5 | P | D0 | D1 | D2 |
| 15 | P | D0 | D1 | D2 | D3 | D4 | D5 |
| 16 | D5 | P | D0 | D1 | D2 | D3 | D4 |
| 17 | D4 | D5 | P | D0 | D1 | D2 | D3 |
| 18 | P | D0 | D1 | D2 | D3 | D4 | D5 |
| 19 | D5 | P | D0 | D1 | D2 | D3 | D4 |
| 20 | P | D0 | D1 | D2 | D3 | D4 | D5 |
| 21 | P | D0 | D1 | D2 | D3 | D4 | D5 |
| 22 | D5 | P | D0 | D1 | D2 | D3 | D4 |
| 23 | D4 | D5 | P | D0 | D1 | D2 | D3 |
| 24 | D3 | D4 | D5 | P | D0 | D1 | D2 |
| 25 | D2 | D3 | D4 | D5 | P | D0 | D1 |
| 26 | D1 | D2 | D3 | D4 | D5 | P | D0 |
| 27 | P | D0 | D1 | D2 | D3 | D4 | D5 |

FIG. 5

| | | |
|---|---|---|
| Number of drives in array (drv_num) | 7 | |
| Stripe size (sb_sz) | 1MB | |
| Stripe group size (sg_sz) | 1MB×(7-1)=6MB | |
| Management block size (blk_sz) | drv_num(drv_num-1)/2=21 | |
| Management block boundary offset (bdr_ofs) | 0→1 | |
| PR block boundary offset | 0 | |
| R stripe group number (realoc_no) | Rearrangment completion | |
| R drive slot number | Rearrangment completion | |

| Drive slot number | SSD-#0 | SSD-#1 | SSD-#2 | SSD-#3 | SSD-#4 | SSD-#5 | SSD-#6 |
|---|---|---|---|---|---|---|---|
| Drive member number | 0→6 | 1→0 | 2→1 | 3→2 | 4→3 | 5→4 | 6→5 |
| PR member number | 0 | 1 | 2 | 3 | 4 | 5 | 6 |
| Stripe group number | | | | | | | |
| 0 | P→D5 | D0→P | D1→D0 | D2→D1 | D3→D2 | D4→D3 | D5→D4 |
| 1 | D5 | P | D0 | D1 | D2 | D3 | D4 |
| 2 | D4 | D5 | P | D0 | D1 | D2 | D3 |
| 3 | D3 | D4 | D5 | P | D0 | D1 | D2 |
| 4 | D2 | D3 | D4 | D5 | P | D0 | D1 |
| 5 | D1 | D2 | D3 | D4 | D5 | P | D0 |
| 6 | P→D0 | D0→D1 | D1→D2 | D2→D3 | D3→D4 | D4→D5 | D5→P |
| 7 | D5 | P | D0 | D1 | D2 | D3 | D4 |
| 8 | D4 | D5 | P | D0 | D1 | D2 | D3 |
| 9 | D3 | D4 | D5 | P | D0 | D1 | D2 |
| 10 | D2 | D3 | D4 | D5 | P | D0 | D1 |
| 11 | P→D1 | D0→D2 | D1→D3 | D2→D4 | D3→D5 | D4→P | D5→D0 |
| 12 | D5 | P | D0 | D1 | D2 | D3 | D4 |
| 13 | D4 | D5 | P | D0 | D1 | D2 | D3 |
| 14 | D3 | D4 | D5 | P | D0 | D1 | D2 |
| 15 | P→D2 | D0→D3 | D1→D4 | D2→D5 | D3→P | D4→D0 | D5→D1 |
| 16 | D5 | P | D0 | D1 | D2 | D3 | D4 |
| 17 | D4 | D5 | P | D0 | D1 | D2 | D3 |
| 18 | P→D3 | D0→D4 | D1→D5 | D2→P | D3→D0 | D4→D1 | D5→D2 |
| 19 | D5 | P | D0 | D1 | D2 | D3 | D4 |
| 20 | P→D4 | D0→D5 | D1→P | D2→D0 | D3→D1 | D4→D2 | D5→D3 |
| 21 | P→D5 | D0→P | D1→D0 | D2→D1 | D3→D2 | D4→D3 | D5→D4 |
| 22 | D5 | P | D0 | D1 | D2 | D3 | D4 |
| 23 | D4 | D5 | P | D0 | D1 | D2 | D3 |
| 24 | D3 | D4 | D5 | P | D0 | D1 | D2 |
| 25 | D2 | D3 | D4 | D5 | P | D0 | D1 |
| 26 | D1 | D2 | D3 | D4 | D5 | P | D0 |
| 27 | P→D0 | D0→D1 | D1→D2 | D2→D3 | D3→D4 | D4→D5 | D5→P |

F I G. 9

| | Rearrangement-completed area | Rearrangement not-completed area |
|---|---|---|
| Parity block arrangement drive member number (pdrv_no) | Drive member number | PR member number |
| Data block arrangement drive member number (dblk_drv) | Drive member number | PR member number |
| Management block boundary offset (bdr_ofs) | Management block boundary offset | PR block boundary offset |

F I G. 10

| | | | | | | | | |
|---|---|---|---|---|---|---|---|---|
| Number of drives in array (drv_num) | | | | | 7 | | | |
| Stripe size (sb_sz) | | | | | 1MB | | | |
| Stripe group size (sg_sz) | | | | | 1MB×(7-1)=6MB | | | |
| Management block size (blk_sz) | | | | | drv_num(drv_num-1)/2=21 | | | |
| Management block boundary offset (bdr_ofs) | | | | | 0→1 | | | |
| PR block boundary offset | | | | | 0 | | | |
| R stripe group number (realoc_no) | | | | | 28 | | | |
| R drive slot number | | | | | SSD-#1 | | | |
| Drive slot number | SSD-#0 | SSD-#1 | SSD-#2 | SSD-#3 | SSD-#4 | SSD-#5 | SSD-#6 | SSD-SP |
| Drive member number | 6 | 0 | 1 | 2 | 3 | 4 | 5 | 6 |
| PR member number | 0 | 1 | 2 | 3 | 4 | 5 | 6 | 0 |
| Stripe group number | | | | | | | | |
| 0 | P→D5 | D0→P | D1→D0 | D2→D1 | D3→D2 | D4→D3 | D5→D4 | P |
| 1 | D5 | P | D0 | D1 | D2 | D3 | D4 | D5 |
| 2 | D4 | D5 | P | D0 | D1 | D2 | D3 | D4 |
| 3 | D3 | D4 | D5 | P | D0 | D1 | D2 | D3 |
| 4 | D2 | D3 | D4 | D5 | P | D0 | D1 | D2 |
| 5 | D1 | D2 | D3 | D4 | D5 | P | D0 | D1 |
| 6 | P→D0 | D0→D1 | D1→D2 | D2→D3 | D3→D4 | D4→D5 | D5→P | P |
| 7 | D5 | P | D0 | D1 | D2 | D3 | D4 | D5 |
| 8 | D4 | D5 | P | D0 | D1 | D2 | D3 | D4 |
| 9 | D3 | D4 | D5 | P | D0 | D1 | D2 | D3 |
| 10 | D2 | D3 | D4 | D5 | P | D0 | D1 | D2 |
| 11 | P→D1 | D0→D2 | D1→D3 | D2→D4 | D3→D5 | D4→P | D5→D0 | P |
| 12 | D5 | P | D0 | D1 | D2 | D3 | D4 | D5 |
| 13 | D4 | D5 | P | D0 | D1 | D2 | D3 | D4 |
| 14 | D3 | D4 | D5 | P | D0 | D1 | D2 | D3 |
| 15 | P→D2 | D0→D3 | D1→D4 | D2→D5 | D3→P | D4→D0 | D5→D1 | P |
| 16 | D5 | P | D0 | D1 | D2 | D3 | D4 | D5 |
| 17 | D4 | D5 | P | D0 | D1 | D2 | D3 | D4 |
| 18 | P→D3 | D0→D4 | D1→D5 | D2→P | D3→D0 | D4→D1 | D5→D2 | P |
| 19 | D5 | P | D0 | D1 | D2 | D3 | D4 | D5 |
| 20 | P→D4 | D0→D5 | D1→P | D2→D0 | D3→D1 | D4→D2 | D5→D3 | P |
| 21 | P→D5 | D0→P | D1→D0 | D2→D1 | D3→D2 | D4→D3 | D5→D4 | P |
| 22 | D5 | P | D0 | D1 | D2 | D3 | D4 | D5 |
| 23 | D4 | D5 | P | D0 | D1 | D2 | D3 | D4 |
| 24 | D3 | D4 | D5 | P | D0 | D1 | D2 | D3 |
| 25 | D2 | D3 | D4 | D5 | P | D0 | D1 | D2 |
| 26 | D1 | D2 | D3 | D4 | D5 | P | D0 | D1 |
| 27 | P→D0 | D0→D1 | D1→D2 | D2→D3 | D3→D4 | D4→D5 | D5→P | P |

F I G. 12

| | | 28 |
|---|---|---|
| Number of drives in array (drv_num) | 7 | |
| Stripe size (sb_sz) | 1MB | |
| Stripe group size (sg_sz) | 1MB×(7-1)=6MB | |
| Management block size (blk_sz) | drv_num(drv_num-1)/2=21 | |
| Management block boundary offset (bdr_ofs) | 0→1 | |
| PR block boundary offset | 0 | |
| R stripe group number (realoc_no) | Rearrangment completion | |
| R drive slot number | Rearrangment completion | 29 |

| Drive slot number | SSD-#0 →SSD-SP | SSD-#1 | SSD-#2 | SSD-#3 | SSD-#4 | SSD-#5 | SSD-#6 | SSD-SP →SSD-#0 |
|---|---|---|---|---|---|---|---|---|
| Drive member number | 6 | 0 | 1 | 2 | 3 | 4 | 5 | 6 |
| PR member number | 0 | 1 | 2 | 3 | 4 | 5 | 6 | 0 |
| Stripe group number | | | | | | | | |
| 0 | P | D0→P | D1→D0 | D2→D1 | D3→D2 | D4→D3 | D5→D4 | P→D5 |
| 1 | D5 | P | D0 | D1 | D2 | D3 | D4 | D5 |
| 2 | D4 | D5 | P | D0 | D1 | D2 | D3 | D4 |
| 3 | D3 | D4 | D5 | P | D0 | D1 | D2 | D3 |
| 4 | D2 | D3 | D4 | D5 | P | D0 | D1 | D2 |
| 5 | D1 | D2 | D3 | D4 | D5 | P | D0 | D1 |
| 6 | P | D0→D1 | D1→D2 | D2→D3 | D3→D4 | D4→D5 | D5→P | P→D0 |
| 7 | D5 | P | D0 | D1 | D2 | D3 | D4 | D5 |
| 8 | D4 | D5 | P | D0 | D1 | D2 | D3 | D4 |
| 9 | D3 | D4 | D5 | P | D0 | D1 | D2 | D3 |
| 10 | D2 | D3 | D4 | D5 | P | D0 | D1 | D2 |
| 11 | P | D0→D2 | D1→D3 | D2→D4 | D3→D5 | D4→P | D5→D0 | P→D1 |
| 12 | D5 | P | D0 | D1 | D2 | D3 | D4 | D5 |
| 13 | D4 | D5 | P | D0 | D1 | D2 | D3 | D4 |
| 14 | D3 | D4 | D5 | P | D0 | D1 | D2 | D3 |
| 15 | P | D0→D3 | D1→D4 | D2→D5 | D3→P | D4→D0 | D5→D1 | P→D2 |
| 16 | D5 | P | D0 | D1 | D2 | D3 | D4 | D5 |
| 17 | D4 | D5 | P | D0 | D1 | D2 | D3 | D4 |
| 18 | P | D0→D4 | D1→D5 | D2→P | D3→D0 | D4→D1 | D5→D2 | P→D3 |
| 19 | D5 | P | D0 | D1 | D2 | D3 | D4 | D5 |
| 20 | P | D0→D5 | D1→P | D2→D0 | D3→D1 | D4→D2 | D5→D3 | P→D4 |
| 21 | P | D0→P | D1→D0 | D2→D1 | D3→D2 | D4→D3 | D5→D4 | P→D5 |
| 22 | D5 | P | D0 | D1 | D2 | D3 | D4 | D5 |
| 23 | D4 | D5 | P | D0 | D1 | D2 | D3 | D4 |
| 24 | D3 | D4 | D5 | P | D0 | D1 | D2 | D3 |
| 25 | D2 | D3 | D4 | D5 | P | D0 | D1 | D2 |
| 26 | D1 | D2 | D3 | D4 | D5 | P | D0 | D1 |
| 27 | P | D0→D1 | D1→D2 | D2→D3 | D3→D4 | D4→D5 | D5→P | P→D0 |

STORAGE APPARATUS, STORAGE CONTROLLER, AND METHOD FOR MANAGING LOCATIONS OF ERROR CORRECTING CODE BLOCKS IN ARRAY

CROSS REFERENCE TO RELATED APPLICATIONS

This application is a Continuation Application of PCT Application No. PCT/JP2012/073339, filed Sep. 12, 2012, the entire contents of which are incorporated herein by reference.

FIELD

Embodiments described herein relate generally to a storage apparatus, a storage controller, and a method for managing locations of error correcting code blocks in an array.

BACKGROUND

Conventionally, storage devices each including a disk array are known. Generally, the disk array is constructed by RAID (redundant arrays of independent disks or redundant arrays of inexpensive disks) using a plurality of hard disk drives (HDD). Such a disk array (hereinafter, referred to as a first array) has redundancy by applying error correcting code data such as parity data.

In addition, in recent years, storage devices each including an array (hereinafter, referred to as a second array) that comprises a plurality of solid state drives (SSD) appear. The SSD comprises non-volatile rewritable memories such as NAND-type flash memories. Accordingly, the access performance of the SSD is higher than that of the HDD accompanied by a mechanical operation in reading/writing data. However, the life of an SSD, for example, depends on the number of data write operations to the SSD.

In the first array, for load distribution, generally, error correcting code blocks (for example, parity blocks) are arranged by being uniformly distributed on the plurality of HDDs in units of areas called stripe groups. Thus, also in the second array, the error correcting code blocks are assumed to be arranged by being uniformly distributed on the plurality of SSDs in units of stripe groups. In such a case, the numbers of data write operations to the plurality of SSDs are uniformized, and there is a high possibility that the plurality of SSDs fail at the same time. Accordingly, in the second array, it is required that the numbers of data write operations to the plurality of SSDs are non-uniform.

Thus, according to a conventional technology, a controller (storage controller) in the storage device monitors the numbers of data write operations to the plurality of SSDs. As a result of the monitoring, in a case where the numbers of writing needs to be non-uniform, the controller dynamically changes the locations of the error correcting code blocks and the locations of the data blocks in units of stripe groups. For the change of the locations, the controller manages the locations of the error correcting code blocks and the locations of the data blocks for each stripe group, using a map table.

However, according to the conventional technology, the memory capacity that is necessary for storing the map table tends to increase in accordance with a recent increase in the capacity of the array. In addition, in a case where the changes in the locations of the error correcting code blocks and the locations of the data blocks are excessively performed, the number of data write operations to each SSD increases in accordance with the changes.

BRIEF DESCRIPTION OF THE DRAWINGS

FIG. 1 is a block diagram showing an exemplary hardware configuration of a storage system according to an embodiment;

FIG. 2 is a block diagram showing the functional configuration of a storage controller shown in FIG. 1;

FIG. 3 is a diagram showing an example of the arrangement of a parity block and data blocks for each stripe group in a solid state drive (SSD) array of RAID level 5;

FIG. 4 is a diagram showing an example of the data structure of array management tables applied to the embodiment;

FIG. 5 is a diagram showing, in association with the array management tables, an example of the arrangement of parity blocks and data blocks in an SSD array applied to the embodiment;

FIG. 9 is a diagram showing, in association with the array management tables, an example of the state after completion of the rearrangement of parity blocks and data blocks in block rearrangement applied to the embodiment;

FIG. 10 is a diagram showing an example of parameter value switching according to the embodiment in a table form;

FIG. 12 is a diagram showing, in association with the array management tables, an example of the state in the middle of the rearrangement of parity blocks and data blocks in the block rearrangement applied to the embodiment; and FIG. 13 is a diagram showing, in association with the array management tables, an example of the state after completion of the rearrangement of parity blocks and data blocks in the block rearrangement applied to a modification of the embodiment.

DETAILED DESCRIPTION

Figure 6:
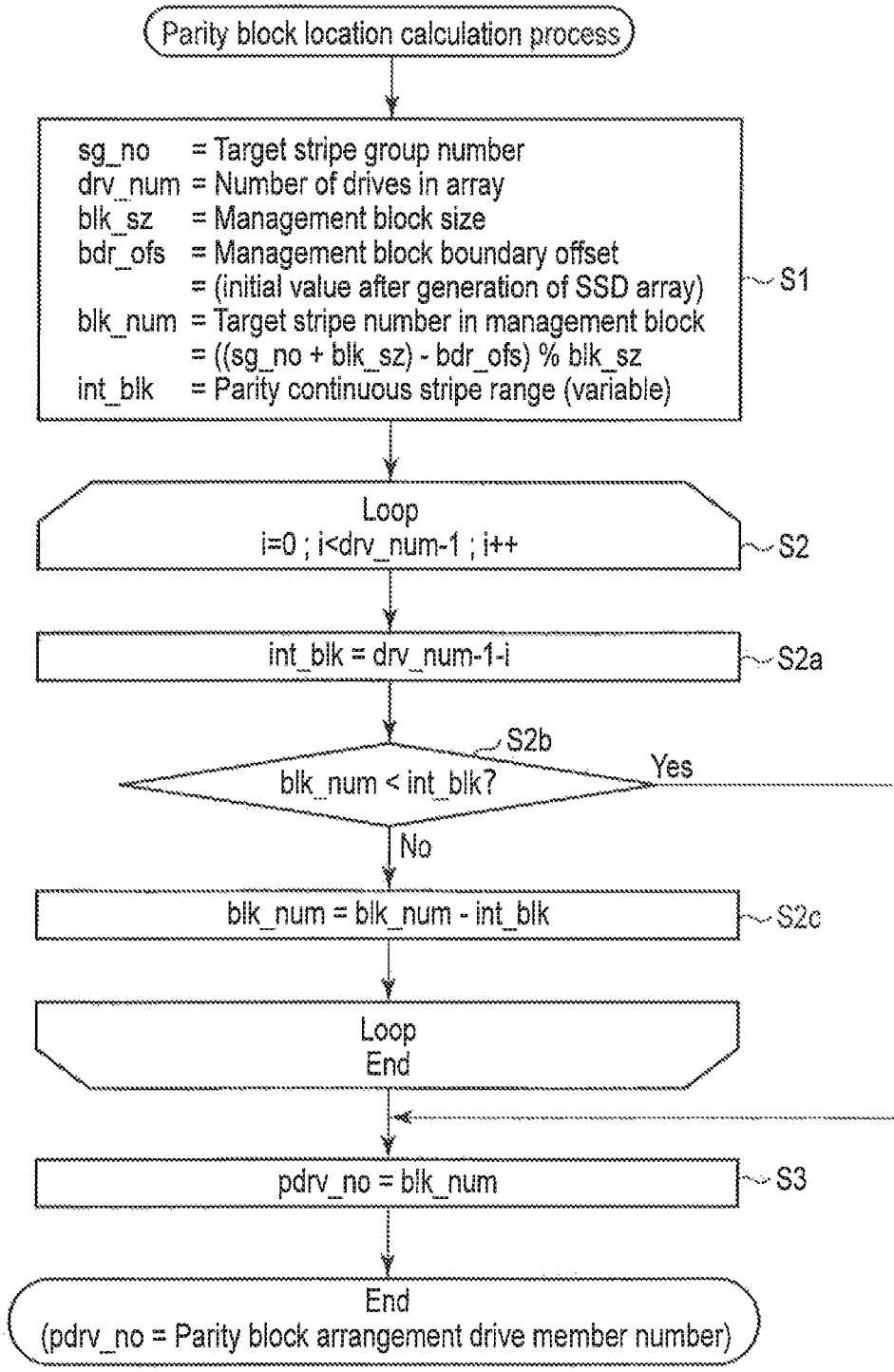
FIG. 6 is a flowchart illustrating an exemplary procedure of a parity block location calculation process applied to the embodiment.

Various embodiments will be described hereinafter with reference to the accompanying drawings.

In general, according to one embodiment, a storage apparatus comprises a group of solid state drives and a storage controller. The group of solid state drives includes a plurality of solid state drives. Each of the plurality of solid state drives comprises a first storage area divided into a plurality of stripe blocks. The storage controller is configured to control the group of the solid state drives. The storage controller comprises an array management unit configured to manage an array. The array comprises a second storage area divided into a plurality of stripe groups. A set of an error correcting code block used for storing an error correcting code and a plurality of data blocks used for storing data is arranged in each of the plurality of stripe groups. Each of the plurality of stripe groups comprises a set of the stripe blocks of which physical positions correspond to each other in the plurality of solid state drives. The array management unit is configured to regularly arrange the error correcting code blocks and the data blocks in the plurality of stripe groups based on a predetermined arrangement rule such that the numbers of the arranged error correcting code blocks are non-uniform among the plurality of solid state drives. The array management unit is configured to manage locations of the error correcting code blocks based on the arrangement rule.

FIG. 1 is a block diagram showing an exemplary hardware configuration of a storage system according to an embodiment. The storage system comprises a storage device 1, a host computer (hereinafter, referred to as a host) 2, and a network 3. The storage device 1 is connected to the host 2 via the network 3. The host 2 uses the storage device 1 as an external storage device. The network 3, for example, is a storage area network (SAN), the Internet, or an intranet. The Internet or the intranet, for example, is configured using Ethernet (registered trademark).

The storage device 1 includes a plurality of solid state drives (SSDs), for example, seven SSDs 11-0 to 11-6 (SSD-#0 to SSD-#6), a storage controller 12, and a drive interface bus 13. Each of the SSDs 11-0 to 11-6 is configured by a set of rewritable non-volatile memories (for example, flash memories). The SSDs 11-0 to 11-6 are connected to the drive interface bus 13 via drive slots #0 to #6. Specific drive slot numbers 0 to 6 are allocated to the drive slots #0 to #6. The drive slot numbers 0 to 6 are serial numbers that are fixedly allocated to the drive slots #0 to #6. In the description presented below, the drive slot numbers 0 to 6 are denoted by SSD-#0 to SSD-#6 for convenience sake. SSD-#0 to SSD-#6 also indicate that the attributes of the SSDs 11-0 to 11-6 connected to the drive slots #0 to #6 represent SSDs (that is, the elements of an SSD array 110-*) used in the SSD array 110-* to be described later. In addition, in the description presented below, the SSDs 11-0 to 11-6 connected to the drive slots #0 to #6 may be denoted by SSD-#0 to SSD-#6.

The storage controller 12 is connected to the SSDs 11-0 to 11-6 (SSD-#0 to SSD-#6) via the drive interface bus 13. The interface type of the drive interface bus 13, for example, is a small computer system interface (SCSI), a fibre channel (FC), a serial attached SCSI (SAS), or a serial AT attachment (SATA).

The storage controller 12 controls the SSDs 11-0 to 11-6. The storage controller 12 configures and manages each of arrays (hereinafter, referred to as SSD arrays), which have redundancy, using three or more of the SSDs 11-0 to 11-6. In the example shown in FIG. 1, three SSD arrays 110-0 to 110-2 are shown as the arrays having redundancy. The SSD arrays 110-0 to 110-2, for example, are arrays (that is, RAID arrays) having the RAID configuration. The RAID arrays are managed as logical drives. In the description presented below, when the SSD arrays 110-0 to 110-2 do not need to be particularly discriminated from one another, each of the SSD arrays 110-0 to 110-2 will be denoted by an SSD array 110-*. Similarly, when the SSDs 11-0 to 11-6 do not need to be particularly discriminated from one another, each of the SSDs 11-0 to 11-6 will be denoted by an SSD 11-*.

The storage controller 12 includes a host interface (host I/F) 121, a drive interface (drive I/F) 122, a cache memory 123, a cache controller 124, a flash ROM (FROM) 125, a local memory 126, a CPU 127, a chipset 128, and an internal bus 129. The storage controller 12 is connected to the host 2 by the host I/F 121 via the network 3. The interface type of the host I/F 121, for example, is an FC or an Internet SCSI (iSCSI).

The host I/F 121 controls data transmission (data transmission protocol) to or from the host 2. The host I/F 121 receives a data access request (a read request or a write request) for a logical volume, which is supplied from the host 2, and replies with a response to the data access request. The logical volume is logically implemented using a part of the data storage area in the SSD array 110-* as an entity. When the data access request is received from the host 2, the host I/F 121 transfers the request to the CPU 127 via the internal bus 129 and the chipset 128. The CPU 127 that has received the data access request processes the data access request based on a storage control program to be described later.

When the data access request is a write request, the CPU 127 specifies a data area of the SSD array 110-* that corresponds to an access area (an access area in the logical volume) designated by the write request and controls data writing. More specifically, the CPU 127 controls first data writing or second data writing. The first data writing is an operation of storing write data in the cache memory 123 once and then writing the data to the specified area of the SSD array 110-*. The second data writing is an operation of directly writing write data to the specified area. In the embodiment, it is assumed that the first data writing is performed.

On the other hand, when the data access request is a read request, the CPU 127 specifies a data area of the SSD array 110-* that corresponds to an access area designated by the read request and controls data reading. More specifically, the CPU 127 controls first data reading or second data reading. The first data reading is performed in a case where data of the specified data area is stored in the cache memory 123. That is, the first data reading is an operation of reading the data of the specified physical area from the cache memory 123 and replying with the read data to the host I/F 121, thereby causing the host I/F 121 to reply with the read data to the host 20. The second data reading is performed in a case where the data of the specified physical area is not stored in the cache memory 123. That is, the second data reading is an operation of reading the data from the specified physical area of the disk array 110-* and immediately replying with the read data to the host I/F 121, thereby causing the host I/F 121 to reply with the read data to the host 20.

The drive I/F 122 transmits a write request or a read request for an SSD 11-* of the SSD array 110-* in accordance with a data access request (a write request or a read request for a logical volume) from the host 2, which has been received by the CPU 127 (storage control program), and receives a reply thereto. When a data access request from the host 2 is received by the host I/F 121, the cache memory 123 is used as a buffer for speeding up a reply of the completion to the data access request (a write request or a read request).

When the data access request is a write request, the CPU 127 completes the write process by storing write data in the cache memory 123 once using the cache controller 124 and replies with a response to the host 2. Thereafter, the CPU 127 writes the write data to the SSD array 110-* at an arbitrary timing. Then, the CPU 127 frees the storage area of the cache memory 123 in which the write data is stored, using the cache controller 124. On the other hand, when the data access request is a read request, in a case where the requested data (that is, data to be read) is stored in the cache memory 123, the CPU 127 operates as follows. The CPU 127 acquires the requested data from the cache memory 123, using the cache controller 124 and replies with a response to the host 2 (first data reading).

The cache controller 124 reads data from the cache memory 123 in accordance with a command supplied from the CPU 127 (storage control program). In addition, the cache controller 124 writes data to the cache memory 123 in accordance with a command supplied from the CPU 127.

The FROM 125 is a rewritable non-volatile memory. The FROM 125 is used for storing a storage control program executed by the CPU 127. As a first process performed when the storage controller 12 is started up, the CPU 127 copies a storage control program stored in the FROM 125 to the local memory 126. Here, a non-volatile memory dedicated for reading data, for example, a ROM may be used instead of the FROM 125.

The local memory 126 is a volatile memory the data of which can be rewritten, such as a DRAM. A part of the area of the local memory 126 is used for storing the storage control program copied from the FROM 125. On the other hand, the other part of the area of the local memory 126 is used as a work area for the CPU 127. The CPU 127 controls the entire storage device 1 (especially, each unit of the storage controller 12) in accordance with program codes of the storage control program stored in the local memory 126. That is, the CPU 127 executes the storage control program stored in the local memory 126 via the chipset 128, thereby controlling the entire storage device 1.

The chipset 128 is a bridge circuit that connects the CPU 127 and peripheral circuits thereof to the internal bus 129. The internal bus 129 is a universal bus and, for example, is a peripheral component interconnect (PCI) express bus. The host I/F 121, the drive I/F 122, and the chipset 128 are interconnected via the internal bus 129. In addition, the cache controller 124, the FROM 125, the local memory 126, and the CPU 127 are connected to the internal bus 129 via the chipset 128.

FIG. 2 is a block diagram showing the functional configuration of the storage controller 12 shown in FIG. 1. This functional configuration is implemented by the CPU 127 of the storage controller 12 shown in FIG. 1 executing the storage control program. The storage controller 12 includes an array management unit 21, a parity block arrangement calculation unit 22, a data block arrangement calculation unit 23, a block specifying unit 24, a drive replacement controller 25, a block rearrangement determination unit 26, the array access controller 27, an array management table 28 (#0), and an array management table 29 (#1). The array management unit 21 includes an array generation unit 210. The drive replacement controller 25 includes a block rearrangement unit 250. Such elements will be described later.

The SSD array 110-*, as described above, comprises three or more SSDs 11-* and is managed as one logical drive called a RAID array using the RAID technology. The SSD 11-* has advantages that data stored in the SSD 11-* (a flash memory included in the SSD 11-*) is non-volatile, and the data transmission speed is much higher than that of the HDD. On the other hand, for the SSD 11-*, there is an upper limit of the number of data write operations to the SSD 11-* (more specifically, the number of times data write operations to the SSD 11-* can be performed). That is, the life of the SSD 11-* depends on the number of data write operations, and the SSD 11-* is inferior to the HDD in this viewpoint.

Here, a RAID level applied to the SSD array 110-* will be described. As a RAID level that is generally employed in an RAID array constructed using a plurality of HDDs (more specifically, three or more HDDs), RAID level 5 is known. In the RAID level 5, for example, parity data is arranged by being uniformly distributed into a plurality of HDDs in units of areas called stripe groups.

In the RAID array of the RAID level 5, even when one HDD included in the RAID array fails, the data of the HDD that fails can be restored based on data of the other HDDs. In addition, in the RAID array of the RAID level 5, every time data is written to an area arranged in a stripe group, the rewriting of parity data included in the stripe group occurs. However, in the RAID array of the RAID level 5, by arranging the parity data to be distributed uniformly in units of stripe groups, the concentration of accesses (load) to a specific HDD can be prevented. That is, degradation of the response performance according to the RAID control for write accesses to the RAID array can be suppressed to a minimum level.

Thus, it is assumed that the SSD array 110-* is constructed using the RAID level 5 technology. In such a case, by arranging parity data to be uniformly distributed in units of stripe groups, the number of data write operations for each SSD 11-* included in the SSD array 110-* tends to be uniformized. As a result thereof, in a plurality of SSDs 11-* included in the SSD array 110-*, there is a high probability that the numbers of data write operations to the plurality of SSDs 11-* reach the upper limit at the same time. If so, a situation equivalent to a case in which a plurality of SSDs fail at the same time in the SSD array 110-* occurs, and accordingly, the redundancy of the SSD array 110-* cannot be maintained.

The storage control program executed by the CPU 127 includes first to fifth functions described below. The first function is a function of counting the number of data write operations to each SSD 11-*. The second function is a function of monitoring the number of data write operations to the SSD 11-* that is indicated by writing number information supplied by each SSD 11-*.

The third function is a function using a monitoring notification function called self monitoring and reporting technology (SMART) included in each SSD 11-*. This monitoring notification function includes a function of notifying that the number of data write operations to the SSD 11-* is close to the upper limit as an indication of disorder using the SSD 11-*.

The fourth function is a function of detecting an SSD 11-* to which the number of data write operations is close to the upper limit as a first SSD having a highest probability of the occurrence of fail, using one of the first to third functions. The fifth function is a drive preventive maintenance for replacing the first SSD with another second SSD while the SSD array 110-* is maintained in the state of being accessible. The fifth function corresponds to the function of the drive replacement controller 25 to be described later and includes the following sixth to ninth functions.

The sixth function is a function of saving the data stored in the first SSD to a hot spare SSD that is in a standby state in advance. The seventh function is a function of allowing the first SSD to be in the state of being separated from the SSD array 110-* by causing the hot spare SSD to temporarily serve as a replacement SSD of the first SSD after the save. The eighth function is a function of rewriting the data stored in the hot spare SSD to the second SSD after the first SSD separated from the SSD array 110-* is replaced with the second SSD. The ninth function is a function of releasing the replacement SSD state of the hot spare SSD after the completion of the rewriting. According to such functions, the first SSD to which the number of data write operations is close to the upper limit can be replaced with the second SSD while the SSD array 110-* is maintained in the state of being accessible.

Here, it is assumed that the numbers of data write operations to a plurality of SSDs 11-* are close to the upper limit at the same time in the SSD array 110-*. In such a situation, preventive maintenance of the plurality of SSDs 11-* to which the number of data write operations is close to the upper limit is performed for one of the SSDs at a time by employing the drive preventive maintenance function. In such a case, there is a possibility that the number of data write operations to another SSD 11-* in the wait state of the preventive maintenance execution arrives at the upper limit in accordance with the repetition of data writing occurring with an elapse of time.

Thus, a configuration may be considered in which the preventive maintenance of the plurality of SSDs 11-* to which the number of data write operations is close to the upper limit is performed at the same time by employing the drive preventive maintenance function. However, in order to perform the preventive maintenance of the plurality of SSDs 11-* at the same time, it is necessary to prepare hot spare SSDs corresponding to the number of SSDs 11-* used in the SSD array 110-*. Therefore, considering that a unit price of an SSD per constant capacity is higher than that of an HDD, the simultaneous preventive maintenance of a plurality of SSDs 11-* is not practical.

Considering this point, the storage controller 12 of the storage device 1 is required to suppress the numbers of data write operations to a plurality of SSDs 11-* in the SSD array 110-* to arrive at the upper limit at the same time. Accordingly, the storage controller 12 manages the locations of parity blocks and the locations of data blocks in the SSD array 110-* such that the numbers of data write operations to a plurality of SSDs 11-* in the SSD array are non-uniform, as will be described later.

Hereinafter, the locations of parity blocks and data blocks in an SSD array that has been known will be described. Here, the SSD array is assumed to be a RAID array of the RAID level 5. In such an SSD array, the storage area (first storage area) of each of a plurality of SSDs configuring the SSD array is divided into a plurality of stripe blocks of equal capacity. For each set of stripe blocks having the same physical position in the plurality of SSDs, a stripe group is defined. Consecutive stripe group numbers used for identifying the plurality of stripe groups are assigned to the stripe groups. Here, it is assumed that the number of SSDs configuring the SSD array is M.

In the SSD array of the RAID level 5, parities (parity data) are stored in M SSDs by being uniformly distributed in units of (M) stripe groups corresponding to the number M of SSDs configuring the SSD. That is, parities are stored in stripe blocks of mutually-different SSDs in M stripe groups by being uniformly distributed in accordance with a predetermined arrangement rule in units of M stripe groups. From this, when one SSD fails in the SSD array, the data of the failed SSD can be restored based on data and a parity of the remaining SSDs for each stripe group. In the description presented below, a stripe block in which a parity are stored will be referred to as a parity block, and a stripe block in which data is stored will be referred to as a data block.

FIG. 3 shows an example of the locations of a parity block and data blocks for each stripe group in an SSD array of the RAID level 5 as described above. The example shown in FIG. 3 is premised on a case (M=7) where the SSD array comprises seven SSDs corresponding to SSDs 11-0 to 11-6 shown in FIG. 1. Here, the seven SSDs are denoted by SSD-#0 to SSD-#6 for convenience sake.

In the example shown in FIG. 3, the same number of parity blocks are arranged in SSD-#0 to SSD-#6 in the SSD array, and the same number of parity blocks are arranged in SSD-#0 to SSD-#6 while being uniformly distributed. Here, each stripe group of the SSD array comprises one parity block P and six data blocks D0 to D5. According to the SSD array shown in FIG. 3, write accesses are uniformly distributed to SSD-#0 to SSD-#6, and the concentration of the load on a specific SSD can be prevented. When data writing to a data block Dj (j=0, 1, ..., 5) in a stripe group occurs, the parity stored in the parity block P in the stripe group needs to be rewritten. Accordingly, the parity block P becomes a hot spot at which the number of write operations drastically increases out of all the stripe blocks in the stripe group.

Here, it is assumed that data is respectively written to all the data blocks D0 to D5 in one stripe group once. In such a situation, every time data writing occurs, the parity stored in the parity block P is rewritten. In such a case, the number of data write operations to the parity block P is six, which is the same as the number of the data blocks D0 to D5 in the stripe group.

Generally, in the array (RAID array) of the RAID level 5, parity blocks that become hot spots in data writing as described above are arranged such that the same number of the parity blocks are distributed in all the drives included in the array. According to the parity arrangement that is specific to the RAID level 5, write accesses are distributed to all the drives. Accordingly, the concentration of write accesses in a specific drive can be prevented. That is, degradation of the write access performance accompanying RAID control can be reduced.

Such an effect is high in the case of HDDs having a response speed of the drive configuring the array much lower than that of SSDs and accompanied by a mechanical operation. However, in a case where drives configuring the array are SSDs, the SSDs operate at a sufficiently high speed and are not accompanied by a mechanical operation. In such a case, the uniformly-distributed arrangement of parity blocks as in the array of the RAID level 5 mostly does not contribute to the write access performance. In addition, write accesses tend to be performed for all the drives in an almost uniform pattern. Accordingly, the possibility that the numbers of data write operations to a plurality of SSDs in the array (SSD array) are close to the upper limit is high, and a probability causing the stoppage of the array (so-called RAID stoppage) is high. Therefore, it is not necessarily preferable to apply the RAID level 5 to the array configured by a plurality of SSDs.

Thus, in the RAID array (SSD array) that comprises a plurality of SSDs and has redundancy according to parities, the possibility that a plurality of SSDs to which the number of data write operations arrives at the upper limit are present at the same time is requested to be excluded. Accordingly, in a conventional technology, parity blocks are arranged so as to be non-uniformly distributed to a plurality of SSDs such that the numbers of data write operations to the plurality of SSDs are not uniform. More specifically, in a case where the numbers of data write operations to the plurality of SSDs need to be non-uniform, the locations of the parity block and data blocks are dynamically changed in units of stripe groups. In order to perform the location change (that is, rearrangement), the locations of the parity block and data blocks are managed by a map table (arrangement location management table) for each stripe group.

However, as a result of an increase in the capacity of the SSD array, the memory capacity that is necessary for storing the map table increases. Accordingly, a structure is requested to be realized in which the locations of the parity block and data blocks can be simply managed without using a map table while a configuration is employed in which the parity blocks are arranged so as to be non-uniformly distributed to the plurality of SSDs configuring the SSD array. In addition, when changes in the locations of the parity block and data blocks are excessively made, as a result of the changes, the number of write operations to each SSD increases. Accordingly, it is also requested to prevent excessive changes in the locations of the parity block and data blocks.

Therefore, in the embodiment, the storage controller 12 arranges the parity blocks P to be distributed in units of stripe groups such that the numbers of parity blocks P arranged in SSD-#0 to SSD-#6 (SSDs 11-0 to 11-6) configuring the SSD array 110-* are totally different among SSD-#0 to SSD-#6. Particularly, the storage controller 12 arranges N parity blocks P to be distributed regularly and non-uniformly to SSD-#0 to SSD-#6 in units of N stripe groups, which are determined in advance, having consecutive stripe group numbers. In the embodiment, when the number of SSDs configuring the SSD array 110-* is M, N is represented as M(M−1)/2. That is, when M is 7, N=21.

According to the arrangement of the parity blocks P that is specific to the embodiment, the numbers of accesses to SSD-#0 to SSD-#6 (particularly, write accesses) can be non-uniform. In addition, in the embodiment, the storage controller 12 applies a regular arrangement (that is, a patterned arrangement) in units of N (N=M(M−1)/2) stripe groups instead of a random arrangement to the non-uniform arrangement of the parity blocks P to SSD-#0 to SSD-#6.

Accordingly, the storage controller 12 can manage the locations of the parity blocks P and the locations of the data blocks D0 to D5 based on a predetermined arrangement rule (that is, an arrangement pattern). That is, in the embodiment, similarly to the SSD array of the RAID level 5, the locations of the parity blocks and the locations of the data blocks are managed based on the arrangement rule, using drive member numbers, which will be described later, logically assigned to SSD-#0 to SSD-#6 configuring the SSD array 110-*. Accordingly, a map table (arrangement location management table) requiring a large memory capacity is not needed for the management of the locations of the parity blocks and the locations of the data blocks.

However, the applied arrangement rule of the SSD array 110-* according to the embodiment differs from that of the SSD array of the RAID level 5. That is, in the SSD array 110-* according to the embodiment, as described above, N parity blocks P are regularly arranged so as to be non-uniformly distributed to SSD-#0 to SSD-#6 in units of N (N=M(M−1)/2) stripe groups. In contrast to this, in the SSD array of the RAID level 5, as shown in FIG. 3, the parity blocks P are regularly arranged to be uniform in SSD-#0 to SSD-#6 in units of M (here, M=7) stripe groups. Here, M is the number of SSDs respectively configuring the SSD array 110-* and the SSD array of the RAID level 5.

Hereinafter, a specific example of the arrangement of the parity blocks and the arrangement of the data blocks in the SSD array 110-* applied to the embodiment will be described. In the description presented below, the arrangement of the parity blocks and the arrangement of the data blocks may be referred to as a parity arrangement and a data arrangement.

First, terms relating to the SSD array 110-* applied to the embodiment will be sequentially described.

Number of Drives in Array (drv_num)

The number of drives in array represents the number of drives (that is, SSDs) configuring the SSD array 110-*. In the embodiment in which the SSD array 110-* comprises SSD-#0 to SSD-#6 (more specifically, SSD-#0 to SSD-*6 connected to the drive slots #0 to #6), the number of drives in array is seven (drv_num−7).

Stripe Size (sb_sz)

The stripe size represents the capacity of each stripe block.

Stripe Group Size (sg_sz)

The stripe group size represents the capacity of all the data blocks within each stripe group. The stripe group size, similarly to that of the array of the RAID level 5, is a value that is acquired by multiplying a value acquired by subtracting one (the number of parity blocks P within the stripe group) from the number of drives in array (drv_num) by the stripe size (sb_sz).

Management Block

A management block is configured in units of sets of a plurality of stripe groups having consecutive stripe group numbers. The parity arrangement (more specifically, the parity arrangement and the data arrangement) is patterned in units of management blocks. That is, the management block is a block used for managing the locations of parity blocks. The arrangement pattern (hereinafter, referred to as a parity arrangement pattern) represents the location (parity block location) of the parity block P in units of stripe groups in each management block. More specifically, the parity arrangement pattern represents the locations (the parity block location and the data block locations) of the parity block P and data blocks D0 to D5 in units of stripe groups in each management block.

The feature of the parity arrangement pattern represents a parity arrangement in which the numbers of parity blocks P arranged in the management block are totally different among SSD-#0 to SSD-#6 configuring the SSD array 110-*. More specifically, according to the parity arrangement pattern, the parity block P is not arranged in an SSD having a largest drive member number. In addition, according to the parity arrangement pattern, the parity blocks P are arranged such that the parity arrangement number (that is, the number of arranged parity blocks P) increases by one for each decrement of one in the drive member number.

Management Block Size (blk_sz)

The management block size represents the number of stripe groups configuring the management block. In the case of the above-described parity arrangement pattern, the management block size is represented as drv_num(drv_num−1)/2. Here, drv_num represents the number of drives in array. In the embodiment in which the number of drives in array (drv_num) is seven, the management block size is 21. That is, the management block comprises 21 stripe groups having consecutive stripe group numbers sg_no.

Management Block Boundary Offset (bdr_ofs)

The management block boundary offset is used in a case where the location of the parity block P, and furthermore, the locations of data blocks Dj (j=0, 1, . . . , 5) are calculated in units of stripe groups. The management block boundary offset is set to zero immediately after the SSD array 110-* is generated (or defined or constructed). In addition, the management block boundary offset increases by one every time a parity rearrangement process is started.

The parity rearrangement process is a process for rearranging the parity block P and the data blocks Dj. The parity rearrangement process is performed in a case where an SSD to which the number of data write operations arrives at the upper limit is detected to be present in the SSD array 110-*, and the replacement of the SSD is performed. In a case where the management boundary offset after an increase by one coincides with the management block size (the number of stripe groups in the management block), the management block boundary offset is returned to zero. That is, the management block boundary offset represents the position of a starting stripe group of the parity arrangement pattern (the management block). In addition, the management block boundary offset is also used for specifying a parity block P and a data block Dj as access targets in a case where an access to an area in which the rearrangement of the parity blocks and data blocks is completed by the parity rearrangement process is requested from the host 2.

Prior-Rearrangement Block Boundary Offset

The prior-rearrangement block boundary offset (hereinafter, referred to as a PR block boundary offset) is used in a case where the location of the parity block P and, furthermore, the locations of the data blocks Dj are calculated in units of stripe groups. The PR block boundary offset set to the same value as that of the management block boundary offset immediately after the SSD array 110-* is generated (constructed). In addition, the PR block boundary offset is set to the management block boundary offset before update when the parity rearrangement process is started. In addition, the PR block boundary offset is also used for specifying the parity block P and the data block Dj as access targets in a case where an access to an area in which the rearrangement process of the parity block and data blocks has not been performed during the period of the parity rearrangement process is requested from the host 2.

Stripe Group Number During Parity Rearrangement

The stripe group number during parity rearrangement (hereinafter, referred to as an R stripe group number) represents an execution position in the parity rearrangement process, that is, a stripe group number during the execution of the parity rearrangement.

Data Block Number

The data block numbers represent serial numbers that are fixedly assigned to the data blocks D0 to D5 within the stripe group. Here, data block numbers of 0 to 5 are assigned to the data blocks D0 to D5.

Drive Slot Number

The drive slot numbers represent serial numbers that are fixedly assigned to all the SSDs (that is, SSDs 11-0 to 11-6) configuring the SSD 11-*. Here, numbers 0 to 6 (SSD-#0 to SSD-#6) assigned to the drive slots to which the SSDs 11-0 to 11-6 are connected are used as the drive slot numbers of the SSDs 11-0 to 11-6.

Drive Slot Number During Parity Rearrangement

The drive slot number during the parity rearrangement (hereinafter, referred to as an R drive slot number) represents the execution position of the rearrangement of the parity block or data block in the stripe group during the execution of the parity rearrangement, that is, a drive slot number of the SSD (drive) that includes the stripe block during the execution of the rearrangement.

Drive Member Number

The drive member numbers are logical serial numbers assigned to SSDs 11-0 to 11-6 that configure the SSD array 110-*. In the embodiment, immediately after the generation of the SSD array 110-*, the array management unit 21 (specifically, the array generation unit 210 of the array management unit 21) sets the drive member numbers of SSDs 11-0 to 11-6 to values that are the same as the drive slot numbers of the SSDs 11-0 to 11-6. In addition, when the parity rearrangement process is started, the block rearrangement unit 250 sets the drive member number of the SSD to be replaced with one (that is, an SSD to which the number of data write operations arrives at the upper limit) of the SSDs 11-0 to 11-6 to zero and increases the drive member numbers of the remaining SSDs by one. The drive member number of each SSD configuring the SSD array 110-* is used for specifying a parity block and a data block as access targets in a case where an access to an area in which the rearrangement of the parity block and data blocks has been completed by the parity arrangement process is requested from the host 2.

Prior-Rearrangement Member Number

The prior-rearrangement member numbers (hereinafter, referred to as PR member numbers) represent logical serial numbers assigned to the SSDs 11-0 to 11-6 configuring the SSD array 110-* before the parity rearrangement process is started. Immediately after the SSD array 110-* is generated, the array management unit 21 sets the PR member number of the SSD 11-* to the same value as the drive slot number of the SSD 11-*. In addition, when the parity rearrangement process is started, the block rearrangement unit 250 sets the PR member number of the SSD 11-* to the drive member number before update of the SSD 11-*. The drive member number of each SSD configuring the SSD array 110-* is used for specifying a parity block and a data block as access targets in a case where an access to an area in which the rearrangement process of the parity block and data blocks has not been performed during the period of the parity rearrangement process is requested from the host 2.

FIG. 4 shows an example of the data structure of array management tables 28 and 29. The array management table 28 is used for storing first SSD array management information used for managing the configuration of the SSD array 110-*, and the array management table 29 is used for storing second SSD array management information used for managing the configuration of the SSD array 110-*. The SSD array 110-* is generated (defined) by the array generation unit 210 of the array management unit 21. The array management tables 28 and 29 are generated by the array management unit 21 when the SSD array 110-* is generated. In the embodiment, the array management tables 28 and 29 are stored in the local memory 126.

The first SSD array management information includes information of the number of drives in array (drv_num), the stripe size (sb_sz), the stripe group size (sg_sz), the management block size (blk_sz), the management block boundary offset (bdr_ofs), the PR block boundary offset (prior rearrangement block boundary offset), the R stripe group number (the stripe group number during the parity rearrangement), and the R drive slot number (the drive slot number during the parity rearrangement). On the other hand, the second SSD array management information represents the correspondence among the drive slot numbers of the SSDs 11-0 to 11-6 configuring the SSD array 110-*, the drive member numbers of the SSDs 11-0 to 11-6, and the PR member numbers (prior rearrangement drive member numbers) of the SSDs 11-0 to 11-6.

FIG. 5 shows an example of the arrangement of a parity block P and data blocks D0 to D5 in the SSD array 110-* in association with the array management table 29. In the example shown in FIG. 5, a set of stripe groups having stripe group numbers of 0 to 20 is used as one management block. Although not shown in FIG. 5, in the embodiment, a set of stripe groups having stripe group numbers of 21 to 41 is also used as one management block.

The management block is a set of a plurality of continuous stripe groups (in the embodiment, 21 stripe groups) forming a regular arrangement location pattern (arrangement pattern) of the parity block P and the data blocks D0 to D5. The management block is defined by the array management unit 21.

In the example shown in FIG. 5, the SSD having a largest drive member number is SSD-#6 (SSD 11-6). In this case, in any one of 21 stripe groups configuring the management block, the parity block P is not arranged in a corresponding stripe block in the SSD-#6.

On the other hand, in the other SSD-#5 to SSD-#0 (SSDs 11-5 to 11-0), the parity blocks are arranged such that the parity arrangement number increases by one for each decrement of one in the drive member number compared to that of the SSD-#6. From this, in the management block, the numbers of parity blocks arranged in SSD-#5, SSD-#4, SSD-#3, SSD-#2, SSD-#1, and SSD-#0 having drive member numbers of 5, 4, 3, 2, 1, and 0 are 1, 2, 3, 4, 5, and 6.

Next, an exemplary procedure of the parity block location calculation process applied to the embodiment in a case where the contents of the array management tables 28 and 29 are as shown in FIG. 4 as an example will be described with reference to a flowchart shown in FIG. 6. The parity block location calculation process is a process for calculating the locations (parity block locations) of the drive in which the parity block P is arranged in a target stripe group. Here, as the location of the parity block, the drive member number of the drive in which the parity block P is arranged is calculated.

The parity block arrangement calculation unit 22 of the storage controller 12, first, sets a target stripe group number sg_no, the number of drives in array drv_num, a management block size blk_sz, a management block boundary offset bdr_ofs, and a target stripe number in management block blk_num in the work area of the local memory 126 (Step S1). In Step S1, the parity block arrangement calculation unit 22 defines a parity continuous stripe range int_blk as a variable. The parity continuous stripe range int_blk is set in the work area.

The target stripe group number sg_no is a stripe group number of a target stripe group (that is, a stripe group that is a target for calculating the parity block location). The number of drives in array drv_num, the management block size blk_sz, and the management block boundary offset bdr_ofs are set by referring to the array management table 28. Immediately after the SSD array 110-\* is generated, the management block boundary offset bdr_ofs is set to an initial value of "0". In the example of the array management table 28 shown in FIG. 4, drv_num=7, blk_sz=21, and bdr_ofs=0.

The target stripe number in management block blk_num is a stripe number representing a relative position of the target stripe group in the management block. The range of the target stripe number in management block blk_num is 0 to 20. The target stripe number in management block blk_num is calculated using the following equation.

$$blk\_num=((sg\_no+blk\_sz)-bdr\_ofs) \% blk\_sz$$

In this equation, symbol % represents a calculation for acquiring the remainder in a case where an integer part of the quotient is calculated by dividing ((sg_no+blk_sz)−bdr_ofs) by blk_sz. In the arrangement shown in FIG. 5 in which the management block boundary offset bdr_ofs is zero, for example, the target stripe number in management block blk_num of the stripe group having a stripe group number sg_no of 0 or 21 is zero. Similarly, the target stripe number in management block blk_num of the stripe group having a stripe group number sg_no of 20 is 20.

The parity continuous stripe range int_blk represents the number (range) of continuous stripe groups (more specifically, stripe groups having consecutive stripe group numbers sg_no) in which the locations of the parity blocks P (that is, the drives in which the parity blocks P are arranged) are mutually different. The parity continuous stripe range int_blk is one of 6, 5, 4, 3, 2, and 1. A maximum value 6 of the parity continuous stripe range int_blk coincides with drive_num−1.

Next, the parity block arrangement calculation unit 22 sequentially repeats the following loop S2 for a variable i that is in the range of i=0 to i=drv_num−2 (=5). However, in a case where the determination of Step S2b to be described later is "Yes", the parity block arrangement calculation unit 22 exits the loop S2.

First, the parity block arrangement calculation unit 22 calculates a parity continuous stripe range int_blk using the following equation (Step S2a).

$$int\_blk=drv\_num-1-i$$

In the case of i=0, the parity continuous stripe range int_blk is 6. Int_blk=6 represents a set of stripe groups, in the management block, having stripe numbers in the range of 0 to 5. In addition, int_blk=5 represents a set of stripe groups, in the management block, having stripe numbers in the range of 6 to 10, and int_blk=4 represents a set of stripe groups, in the management block, having stripe numbers in the range of 11 to 14. Similarly, int_blk=3 represents a set of stripe groups, in the management block, having stripe numbers in the range of 15 to 17, and int_blk=2 represents a set of stripe groups, in the management block, having stripe numbers in the range of 18 to 19. int_blk=1 represents a stripe group, in the management block, having a stripe number of 20.

Next, the parity block arrangement calculation unit 22 determines whether the target stripe number in management block blk_num is less than the calculated int_blk (Step S2b). This determination is performed for checking whether the target stripe group is within the range of stripe groups represented by the calculated int_blk. In a case where int_blk=6 as in the embodiment, if the target stripe number in management block blk_num is one of 0 to 5, the determination of Step S2b is "Yes". In such a case, the parity block arrangement calculation unit 22 exits the loop S2 and proceeds to Step S3. Then, the parity block arrangement calculation unit 22 sets the target stripe number in management block blk_num as a drive member number pdrv_no representing the location of the parity block. From this, if the target stripe number in management block blk_num is 0, 1, 2, 3, 4, or 5 (that is, less than 6) (Yes in step S2b), the drive member number pdrv_no representing the location of the parity block coincides with blk_num.

In contrast to this, if the target stripe number in management block blk_num is not less than 6 (No in Step S2b), the parity block arrangement calculation unit 22 determines that the target stripe group is out of the parity continuous stripe range int_blk=6 (that is, a set of stripe groups, in the management block, having stripe numbers in the range of 0 to 5). In such a case, in order to determine whether the target stripe group is within the next parity continuous stripe range int_blk=5, the parity block arrangement calculation unit 22 decrements the target stripe number in management block blk_num by the current parity continuous stripe range int_blk=6 (Step S2c).

The target stripe number in management block blk_num after the decrement in the case of i=0 represents a relative position in the management block excluding the parity continuous stripe range int_blk=6 (a set of stripe groups, in the management block, having stripe numbers in the range of 0 to 5). In this point, the target stripe number in management block blk_num after decrement is different from the target stripe number blk_num in the management block that is set in Step S1.

Next, the parity block arrangement calculation unit 22 increments the variable i from i=0 to i=1 and performs Step S2a again. In this case, the parity continuous stripe range int_blk is updated from 6 to 5. Then, the parity block arrangement calculation unit 22 determines whether the target stripe number in management block blk_num after decrementing is less than the current int_blk=5 (Step S2b). If the target stripe number in management block (hereinafter, referred to as an initial target stripe number in management block) blk_num that is set in Step S1 is one of 6 to 10, the determination of Step S2b is "Yes". In such a case, the parity block arrangement calculation unit 22 exits the loop S2 and proceeds to Step S3.

In Step S3, the parity block arrangement calculation unit 22 sets the current target stripe number in management block blk_num as the drive member number pdrv_no representing the parity block location. Here, it is assumed that the initial target stripe number in management block blk_num is 6, 7, 8, 9, or 10, and therefore the current target stripe number in management block blk_num is 0, 1, 2, 3, or 4 (Yes in Step S2b). In this case, pdrv_no coincides with the current target stripe number in management block blk_num (that is, 0, 1, 2, 3, or 4).

In contrast to this, if the current target stripe number in management block blk_num is not less than the current int_blk=5 (No in Step S2b), the parity block arrangement calculation unit 22 determines that the target stripe group is out of the current int_blk=5 (that is, a set of stripe groups, in the management block, having stripe numbers in the range of 6 to 10). In this case, in order to determine whether the target stripe group is within the next parity continuous stripe range int_blk=4, the parity block arrangement calculation unit 22 decrements the target stripe number in management block blk_num by the current parity continuous stripe range int_blk=5 (Step S2c).

Next, the parity block arrangement calculation unit 22 increments the variable i from i=1 to i=2 and performs Step S2a again. In this case, the parity continuous stripe range int_blk is updated from 5 to 4. Then, the parity block arrangement calculation unit 22 determines whether the current target stripe number in management block blk_num (after decrement) is less than the current int_blk=4 (Step S2b). If the initial target stripe number in management block blk_num is one of 11 to 14, the determination of Step S2b is "Yes". In such a case, the parity block arrangement calculation unit 22 exits the loop S2 and proceeds to Step S3. In Step S3, the parity block arrangement calculation unit 22 sets the current target stripe number in management block blk_num as the drive member number pdrv_no representing the parity block location. Here, it is assumed that the initial target stripe number in management block blk_num is 11, 12, 13, or 14, and therefore the current target stripe number in management block blk_num is 0, 1, 2, or 3 (Yes in Step S2b). In this case, pdrv_no coincides with the current target stripe number in management block blk_num (that is, 0, 1, 2, or 3).

In contrast to this, if the current target stripe number in management block blk_num is not less than the current int_blk=4 (No in Step S2b), the parity block arrangement calculation unit 22 determines that the target stripe group is out of the current int_blk=4 (that is, a set of stripe groups, in the management block, having the stripe numbers in the range of 11 to 14). In such a case, in order to determine whether the target stripe group is within the next parity continuous stripe range int_blk=3, the parity block arrangement calculation unit 22 decrements the target stripe number in management block blk_num by the current int_blk=4 (Step S2c).

Next, the parity block arrangement calculation unit 22 increments the variable i from i=2 to i=3 and performs Step S2a again. In this case, the parity continuous stripe range int_blk is updated from 4 to 3. Then, the parity block arrangement calculation unit 22 determines whether the current target stripe number in management block blk_num is less than the current int_blk=3 (Step S2b). If the initial target stripe number in management block blk_num is one of 15 to 17, the determination of Step S2b is "Yes". In such a case, the parity block arrangement calculation unit 22 exits the loop S2 and proceeds to Step S3. In Step S3, the parity block arrangement calculation unit 22 sets the current target stripe number in management block blk_num as the drive member number pdrv_no representing the parity block location. Here, it is assumed that the initial target stripe number in management block blk_num is 15, 16, or 17, and therefore the current target stripe number in management block blk_num is 0, 1, or 2 (Yes in Step S2b). In this case, pdrv_no coincides with the current target stripe number in management block blk_num (that is, 0, 1, or 2).

In contrast to this, if the current target stripe number in management block blk_num is not less than the current int_blk=3 (No in Step S2b), the parity block arrangement calculation unit 22 determines that the target stripe group is out of the current int_blk=3 (that is, a set of stripe groups, in the management block, having the stripe numbers in the range of 15 to 17). In such a case, in order to determine whether the target stripe group is within the next parity continuous stripe range int_blk=2, the parity block arrangement calculation unit 22 decrements the target stripe number in management block blk_num by the current int_blk=3 (Step S2c).

Next, the parity block arrangement calculation unit 22 increments the variable i from i=3 to i=4 and performs Step S2a again. In this case, the parity continuous stripe range int_blk is updated from 3 to 2. Then, the parity block arrangement calculation unit 22 determines whether the current target stripe number in management block blk_num is less than the current int_blk=2 (Step S2b). If the initial target stripe number in management block blk_num is one of 18 and 19, the determination of Step S2b is "Yes". In such a case, the parity block arrangement calculation unit 22 exits the loop S2 and proceeds to Step S3. In Step S3, the parity block arrangement calculation unit 22 sets the current target stripe number in management block blk_num as the drive member number pdrv_no representing the parity block location. Here, it is assumed that the initial target stripe number in management block blk_num is 18 or 19, and therefore the current target stripe number in management block blk_num is 0 or 1 (Yes in Step S2b). In this case, pdrv_no coincides with the current target stripe number in management block blk_num (that is, 0 or 1).

In contrast to this, when the current target stripe number in management block blk_num is not less than the current int_blk=2 (No in Step S2b), the parity block arrangement calculation unit 22 determines that the target stripe group is out of the current int_blk=2 (that is, the stripe number is a set of stripe groups, in the management block, having the stripe numbers in the range 18 to 19). In such a case, in order to determine whether the target stripe group is within the next parity continuous stripe range int_blk=1, the parity block arrangement calculation unit 22 decrements the target stripe number in management block blk_num by the current int_blk=2 in Step S2c.

Next, the parity block arrangement calculation unit 22 increments the variable i from i=4 to i=5 and performs Step S2a again. In this case, the parity continuous stripe range int_blk is updated from 2 to 1. Then, the parity block arrangement calculation unit 22 determines whether the current target stripe number in management block blk_num is less than the current int_blk=1 in Step S2b. When the initial target stripe number in management block blk_num is 20, the determination of Step S2b is "Yes". In such a case, the parity block arrangement calculation unit 22 exits the loop S2 and proceeds to Step S3. In Step S3, the parity block arrangement calculation unit 22 sets the current target stripe number in management block blk_num as the drive member number pdrv_no representing the parity block location. Here, it is assumed that the initial target stripe number in management block blk_num is 20, and the current target stripe number in management block blk_num is 0 (Yes in Step S2b). In this case, pdrv_no coincides with the current target stripe number in management block blk_num (that is, 0).

The parity block arrangement calculation unit 22 performs the above-described parity block location calculation process for all the stripe groups configuring the SSD array 110-*, whereby the parity block arrangement drive member number pdrv_no representing the parity block location for each stripe group can be calculated.

In a case where the contents of the array management tables 28 and 29 are as shown in FIG. 4, based on the calculation of the parity block arrangement drive member numbers pdrv_no as described above, for example, the drive member numbers (parity block arrangement drive member numbers) pdr_no of drives in which the parity blocks P of the stripe groups having stripe group numbers sg_no of 0, 1, 2, 3, and 5 are to be arranged are 0, 1, 2, 3, 4, and 5 (see FIG. 5). Similarly, the parity block arrangement drive member numbers pdr_no of drives in which the parity blocks P of the stripe groups having stripe group numbers sg_no of 6, 7, 8, 9, and 10 are to be arranged are 0, 1, 2, 3, and 4 (see FIG. 5).

Similarly, the parity block arrangement drive member numbers pdr_no of drives in which the parity blocks P of the stripe groups having stripe group numbers sg_no of 11, 12, 13, and 14 are to be arranged are 0, 1, 2, and 3 (see FIG. 5). Similarly, the parity block arrangement drive member numbers pdr_no of drives in which the parity blocks P of the stripe groups having stripe group numbers sg_no of 15, 16, and 17 are to be arranged are 0, 1, and 2 (see FIG. 5). Similarly, the parity block arrangement drive member numbers pdr_no of drives in which the parity blocks P of the stripe groups having stripe group numbers sg_no of 18 and 19 are to be arranged are 0 and 1 (see FIG. 5). Similarly, the parity block arrangement drive member number pdr_no of a drive in which the parity block P of the stripe group having a stripe group number sg_no of 20 is to be arranged is 0 (see FIG. 5).

Next, an exemplary procedure of a data block location calculation process applied to the embodiment in a case where the contents of the array management tables 28 and 29 are as shown in FIG. 4 as an example will be described with reference to a flowchart shown in FIG. 7. The data block location calculation process is a process for calculating the position (data block location) of a drive in which a target data block in a target stripe group is arranged. Here, as the data block location, the drive member number of the drive in which the data block is arranged is calculated.

The data block arrangement calculation unit 23 of the storage controller 12, first, sets a target stripe group number sg_no, a target data block number dblk_no, the number of drives in array drv_num (=7), a management block size blk_sz (=21), a management block boundary offset bdr_ofs (=0), and a target stripe number in management block blk_num in the work area of the local memory 126 (Step S11). The target stripe group number sg_no is a stripe group number of a stripe group (target stripe group) including a target data block Dj. The target data block number dblk_no is a data block number (j=dblk_no) of the target data block Dj. The target data block is one of six data blocks D0 to D5 of the target stripe group.

Next, the data block arrangement calculation unit 23 causes the parity block arrangement calculation unit 22 to calculate the parity block location in the target stripe group represented by the target stripe group number sg_no (Step S12). That is, the parity block arrangement calculation unit 22 calculates the drive member number pdrv_no representing the parity block location by performing the parity block location calculation process shown in a flowchart illustrated in FIG. 6.

Next, the data block arrangement calculation unit 23 calculates a data block location in which the target data block Dj (j=dblk_no) represented by the target data block number dblk_no is to be arranged, based on the calculated parity arrangement drive member number pdrv_no, the target data block number dblk_no, and the number of drives in array drv_num (=7) (Step S13). That is, the data block arrangement calculation unit 23 calculates a drive member number (data block arrangement drive member number) dblk_drv representing the data block location in which the data block Dj (here, j=dblk_no) is to be arranged, using the following equation.

$$dblk\_drv = ((pdrv\_no + dblk\_no + 1)\ \%\ drv\_num$$

The data block arrangement calculation unit 23 performs the above-described data block location calculation process for the data blocks D0 to D5 of all the stripe groups configuring the SSD array 110-*, whereby, for each stripe group and for each data block, the data block arrangement drive member number dblk_drv representing the location of the data block can be calculated.

According to the calculation of the data block arrangement drive member numbers dblk_drv, in a case where the contents of the array management tables 28 and 29 are as shown in FIG. 4, for example, the drive member numbers (data block arrangement drive member numbers) dblk_drv of drives in which the data blocks D0, D1, D2, D3, D4, and 05 of the stripe group having a stripe group number sg_no of "0" are to be arranged are 1, 2, 3, 4, 5, and 6. Similarly, for example, the drive member numbers dblk_drv of drives in which the data blocks D0, D1, D2, D3, D4, and D5 of the stripe group having a stripe group number sg_no of "1" are to be arranged are 2, 3, 4, 5, 6, and 0.

According to the parity block location calculation process and the data block location calculation process described above, the parity blocks P and the data blocks D0 to D5 are arranged in the parity arrangement pattern as shown in FIG. 5. In the example shown in FIG. 5, it should be noticed that the parity block P is not arranged in the SSD having the largest drive member number. In addition, in the example shown in FIG. 5, in each management block of the SSD array 110-*, the parity block P is arranged such that the arrangement number of the parity block P increases by one every time the drive member number decreases by one. As a result of the arrangement of the parity blocks P, the arrangement numbers of the parity blocks in the management block are 6, 5, 4, 3, 2, 1, and 0 in drives (SSDs 11-*) having drive member numbers of 0, 1, 2, 3, 4, 5, and 6. That is, according to the embodiment, the parity blocks P are arranged regularly and non-uniformly in units of management blocks.

As above, according to the embodiment, the parity blocks P (that is, the parity blocks P that are hot spots for write accesses) are arranged non-uniformly in SSD-#0 to SSD-#6 (drives) included in the SSD array 110-*. Accordingly, the respective numbers of data write operations to SSD-#0 to SSD-#6 are different from one another so as to be in correspondence with differences in the numbers of parity blocks P arranged in SSD-#0 to SSD-#6. Accordingly, it can be prevented that the numbers of data write operations to a plurality of SSDs 11-* included in the SSD array 110-* arrive at the upper limit at the same time. Therefore, according to the embodiment, an array stoppage due to multiple fails of the SSDs can be prevented, which are caused as the numbers of data write operations to a plurality of SSDs 11-* included in the SSD array 110-* arrive at the upper limit.

Figure 7:
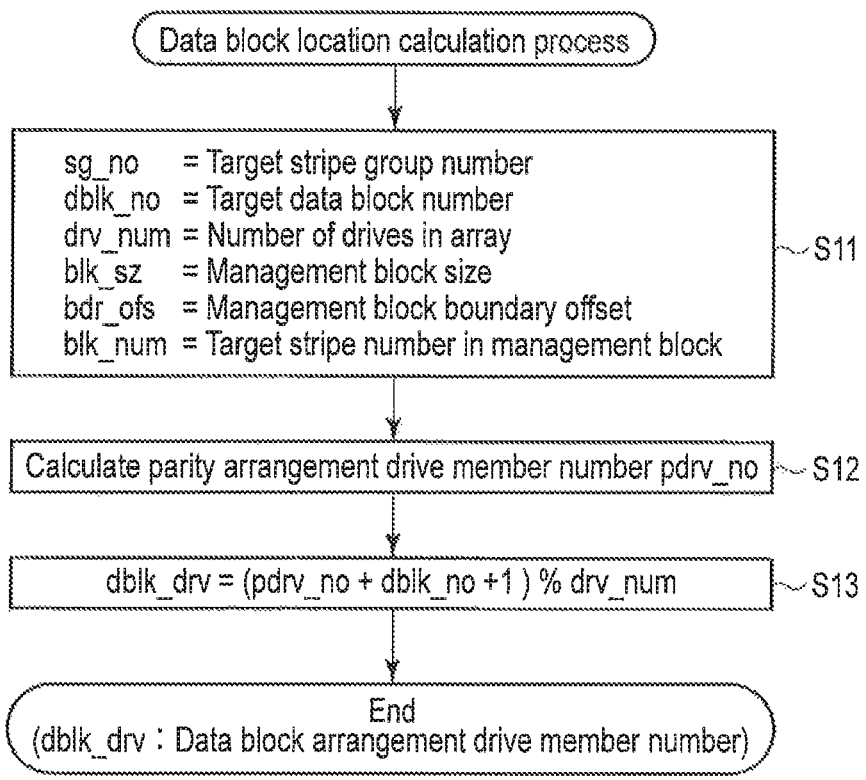
FIG. 7 is a flowchart illustrating an exemplary procedure of a data block location calculation process applied to the embodiment.

In addition, according to the embodiment, the data blocks D0 to D5 of each stripe group, differing from the case of the general SSD array of the RAID level 5, are arranged with the parity block location in the stripe group used as a starting point, by the data block location calculation process shown in FIG. 7. The reason for applying such a data block arrangement is as follows. Now, it is assumed that the number of data write operations to an SSD in which the number of arranged parity blocks P is the most arrives at the upper limit, and therefore the SSD is to be replaced. In such a case, in a general SSD array of the RAID level 5, the parity blocks P and the data blocks D0 to D5 need to be rearranged in all the stripe groups. In contrast to this, in the embodiment, as a result of the data block arrangement described above, by rearranging a minimum number of the parity blocks P and data blocks D0 to D5, the above-described parity arrangement pattern can be maintained. The rearrangement will be described later.

Figure 8A:
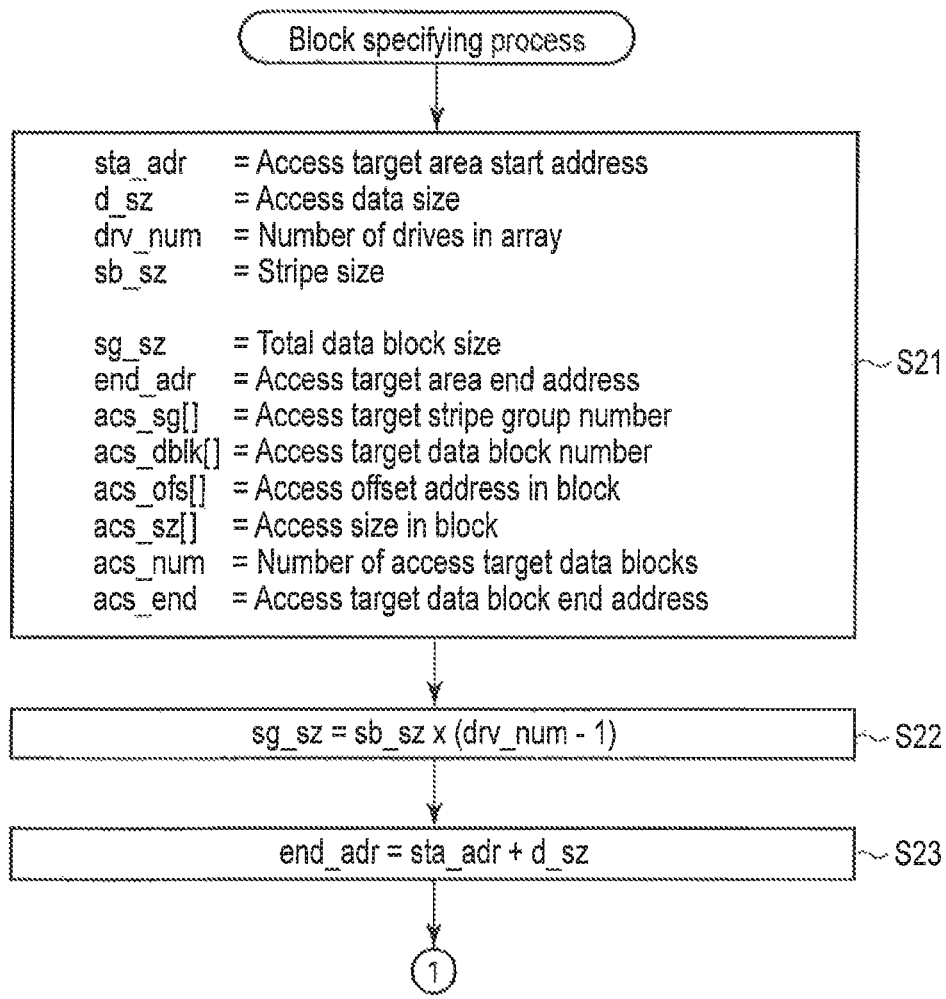
FIG. 8A is a diagram showing a part of a flowchart illustrating an exemplary procedure of a block specifying process applied to the embodiment.

Next, an operation performed in a case where an access to the SSD array 110-* is requested to the storage controller 12 of the storage device 1 from the host 2 will be described. This operation will be described with reference to flowcharts shown in FIGS. 8A and 8B. FIG. 8A is a diagram showing a part of a flowchart illustrating an exemplary procedure of a block specifying process applied to the embodiment, and FIG. 8B is a diagram showing the remaining part of the flowchart.

Figure 8B:
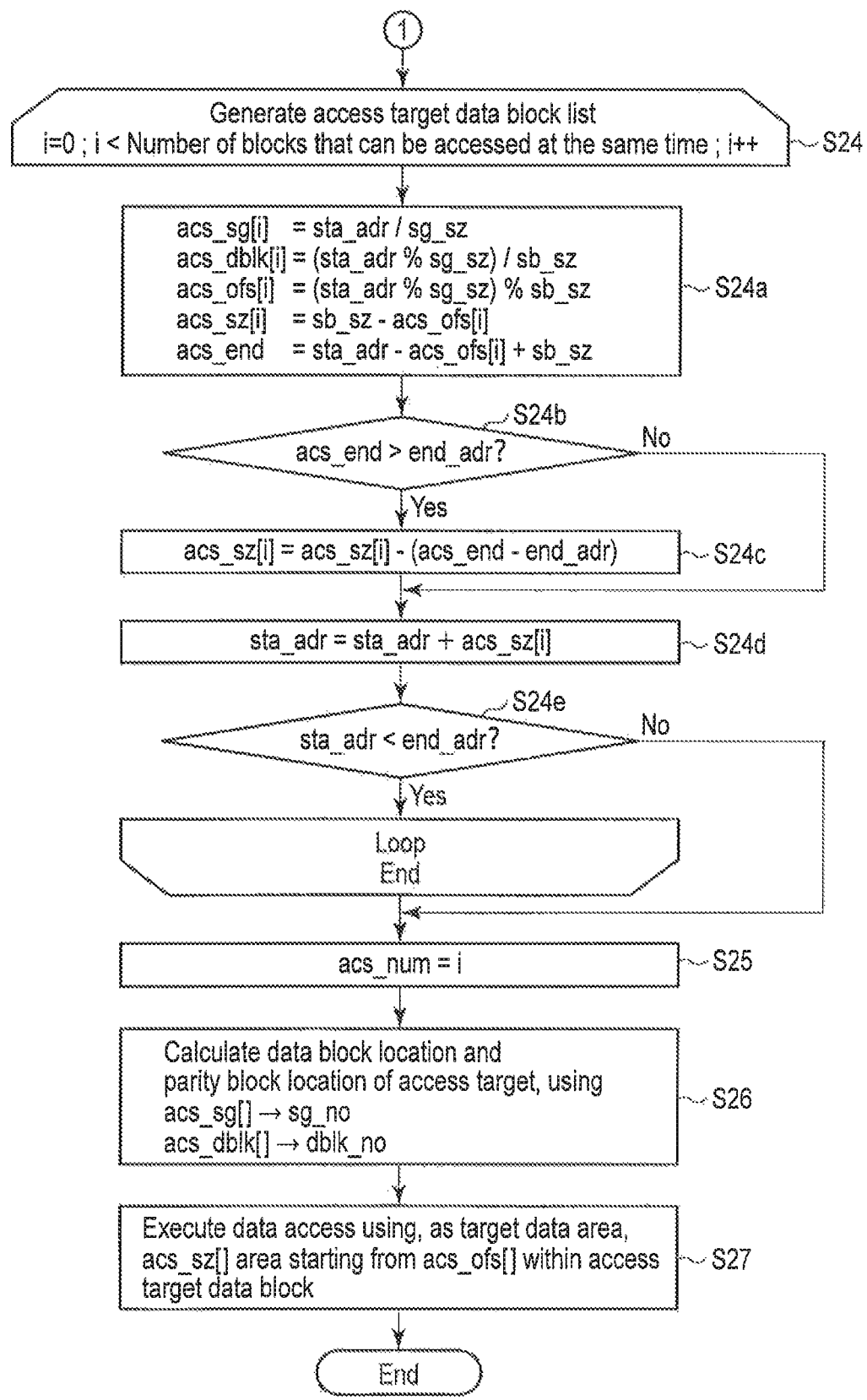
FIG. 8B is a diagram showing the remaining part of the flowchart illustrating the exemplary procedure of the block specifying process.

The block specifying unit 24 of the storage controller 12 performs the block specifying process based on the flowchart shown in FIGS. 8A and 8B. This block specifying process is a process for specifying an access target data block requested from the host 2 through calculation.

First, the block specifying unit 24 sets an access target area start address sta_adr, an access data size d_sz, the number of drives in array drv_num, and a stripe size sb_sz in the work area of the local memory 126 (Step S21). In Step S21, the block specifying unit 24 defines, as variables, a total block size in stripe group (hereinafter, referred to as a total data block size) sg_sz, an access target area end address end_adr, an access target stripe group number acs_sg[ ], an access target data block number acs_dblk[ ], an access offset address in block acs_ofs[ ], an access size in block acs_sz[ ], the number of access target data blocks acs_num, and an access target data block end address acs_end. Such variables are set in the work area.

The access target area start address sta_adr represents a start address of an access target area requested from the host 2. The access data size d_sz represents the size of the access target area. The total data block size sg_sz represents the size of all the data blocks in the stripe group. The access target area end address end_adr represents an address acquired by adding one to an address of the end of the access target area.

The access target stripe group number acs_sg[ ] represents a number (stripe group number) of the access target stripe group. The access target data block number acs_dblk[ ] represents a number (data block number) of the access target data block. The access offset address in block acs_ofs[ ] represents an offset from the start of the access target data block to the access target area start address sta_adr. The access size acs_sz[ ] within the block is a size of the access target data block to be actually accessed and represents a size from the position of the access target area start address sta_adr in the data block to the end of the data block. The number of access target data blocks acs_num represents the number of access target data blocks. The access target data block end address acs_end represents an address of the end of the access target data block.

Next, the block specifying unit 24 calculates the total data block size sg_sz based on the stripe size sb_sz and the number of drives in array drv_num, using the following equation (Step S22).

$$sg\_sz = sb\_sz \times (drv\_num - 1)$$

In addition, the block specifying unit 24 calculates the access target area end address end_adr based on the access target area start address sta_adr and the access data size d_sz, using the following equation (Step S23).

$$end\_adr = sta\_adr + d\_sz$$

Next, the block specifying unit 24 performs loop S24, thereby generating a list of access target data blocks. Here, when the number of blocks that can be access at the same time from the storage controller 12 to the SSD array 110-* is n, the block specifying unit 24 sequentially repeats loop S24 for a variable i from i=0 to i=n-1. However, in a case where a determination made in Step S24e to be described later is No, the parity block arrangement calculation unit 22 exits loop S24.

In loop S24, the block specifying unit 24 calculates the access target stripe group number acs_sg[i], the access target data block number acs_dblk[i], the access offset address in block acs_ofs[i], the access size in block acs_sz[i], and the access target data block end address acs_end (Step S24a). Details of Step S24a are as follows.

First, in Step S24a, the block specifying unit 24 calculates the access target stripe group number acs_sg[i] based on the access target area start address sta_adr and the total data block size sg_sz, using the following equation.

$$acs\_sg[i] = sta\_adr / sg\_sz$$

In addition, in Step S24a, the block specifying unit 24 calculates the access target data block number acs_dblk[i] based on the access target area start address sta_adr, the total data block size sg_sz, and the stripe size sb_sz, using the following equation.

$$acs\_dblk[i] = (sta\_adr \% sg\_sz) / sb\_sz$$

Here, % represented in (sta_adr % sg_sz) represents a calculation for acquiring the remainder in a case where an integer part of the quotient acquired by dividing sta_adr by sg_sz is calculated.

In addition, in Step S24a, the block specifying unit 24 calculates the access offset address in block acs_ofs[i] based on the access target area start address sta_adr, the total data block size sg_sz, and the stripe size sb_sz, using the following equation.

$$acs\_ofs[i] = (sta\_adr \% sg\_sz) \% sb\_sz$$

In addition, in Step S24a, the block specifying unit 24 calculates the access size in block acs_sz[i] based on the stripe size sb_sz and the calculated access offset address in block acs_ofs[i] using the following equation.

$$acs\_sz[i] = sb\_sz - acs\_ofs[i]$$

Furthermore, in Step S24a, the block specifying unit 24 calculates the access target data block end address acs_end based on the access target area address sta_adr, the calculated access offset address in block acs_ofs[i], and the stripe size sb_sz using the following equation.

$$acs\_end = sta\_adr - acs\_ofs[i] + sb\_sz$$

Next, the block specifying unit 24 determines whether the access target data block end address acs_end calculated in Step S24a is higher than the access target area end address end_adr (Step S24b). If the access target data block end address acs_end is higher than the access target area end address end_adr (Yes in Step S24b), the block specifying unit 24 corrects the access size in block acs_sz[i] calculated in Step S24a for a difference between the access target data block end address acs_end and the access target area end address end_adr, using the following equation (Step S24c).

acs_sz[i]=acs_sz[i]-(acs_end-end_adr)

Then, the block specifying unit 24 proceeds to Step S24d. On the other hand, if the access target data block end address acs_end is not higher than the access target area end address end_adr (No in Step S24c), the block specifying unit 24 skips Step S24c and proceeds to Step S24d.

In Step S24d, the block specifying unit 24 updates the access target area start address sta_adr by the current access size in block acs_sz[i] using the following equation.

sta_adr=sta_adr+acs_sz[i]

Next, the block specifying unit 24 determines whether the updated access target area start address sta_adr is lower than the access target area end address end_adr (Step S24e).

If the updated access target area start address sta_adr is lower than the access target area end address end_adr (Yes in Step S24e), the block specifying unit 24 determines that there is a new access target block. In such a case, the block specifying unit 24 increments the variable i. Then, when the variable i after the increment is less than the number n of blocks that can be accessed at the same time, loop S24 is performed again using the variable i after the increment.

On the other hand, when the updated access target area start address sta_adr is not lower than the access target area end address end_adr (No in Step S24e), the block specifying unit 24 exits loop S24 and proceeds to Step S25. In addition, also when the variable i after the increment is not less than the number n of blocks that can be accessed at the same time, the block specifying unit 24 exits loop S24 and proceeds to Step S25.

In Step S25, the block specifying unit 24 sets the number of access target data blocks acs_num to the value of the current variable i. At this time, in the work area, for each variable i from 0 to i, the access target stripe group number acs_sg[i], the access target data block number acs_dblk[i], the access offset address in block acs_ofs[i], and the access size in block acs_sz[i] are set as elements of an access target data block list.

The block specifying unit 24 sets the access target stripe group number acs_sg[ ] as a target stripe group number sg_no for each access target stripe group number acs_sg[ ] (Step S26). In Step S26, the block specifying unit 24 sets the access target data block number acs_dblk[ ] (as the target data block number dblk_no for each target data block number acs_dblk[ ].

In addition, in Step S26, the block specifying unit 24 causes the parity block arrangement calculation unit 22 to calculate the parity block location in the access target stripe group represented by the target stripe group number sg_no for each target stripe group number sg_no based on the flowchart shown in FIG. 6. Furthermore, in Step S26, the block specifying unit 24 causes the data block arrangement calculation unit 23 to calculate the location of the access target data block represented by the target data block number dblk_no for each target data block number dblk_no based on the flowchart shown in FIG. 7. That is, the block specifying unit 24 specifies an access target data block and a parity block (hereinafter, referred to as an access target parity block) in the stripe group in which the access target data block is present.

The array access controller 27 accesses the specified access target data block for each target data block number dblk_no (Step S27). More specifically, the array access controller 27 accesses an area of a size represented by acs_sz[ ] from a location starting from acs_ofs[ ] in the specified access target data block. As such accesses, a read access and a write access differ from each other as follows.

First, in a case where a read access is requested form the host 2, the array access controller 27 reads data from the specified access target data block in the SSD array 110-*. On the other hand, in a case where a write access is requested from the host 2, the array access controller 27 reads data (old data) of the specified access target data block and data (old parity) of the specified access target parity block. The array access controller 27 updates the old data with write data as new data supplied from the host 2. The array access controller 27 generates a new parity based on the new data and the old parity (for example, based on an exclusive-OR operation between the new data and the old parity). The array access controller 27 writes the new data to the access specified target data block and writes the new parity to the specified parity block.

In the embodiment, the parity blocks P are arranged so as to be regularly distributed in units of management blocks such that the numbers of the parity blocks P arranged in the SSD-#0 to SSD-#6 (SSDs 11-0 to 11-6) included in the SSD array 110-* are non-uniform. In the state in which the non-uniform arrangement of the parity blocks P is maintained, the use of the SSD array 110-* is continued.

Then, the number of data write operations to an SSD (that is, SSD-#0 connected to the drive slot #0) in which the arranged number of the parity blocks P is the largest within the SSD array 110-* arrives at the upper limit first. In such a case, in the conventional technology, a hot spare SSD is allocated to the SSD array 110-*, and all the data of SSD-#0 (first SSD) is saved in the hot spare SSD. Here, the hot spare SSD is connected to the drive slot #7 and is assumed to be in the standby state.

When all the data of SSD-#0 (first SSD) is saved on the hot spare SSD, SSD-#0 is replaced with another SSD (second SSD). That is, SSD-#0 is detached from the drive slot #0, and the other SSD is newly connected to the drive slot #0. Thereafter, the data of the hot spare SSD is rewritten to the other SSD (hereinafter, referred to as a replacement SSD). Such rewriting is called copy back, and the SSD replacement process ends in accordance with the rewriting.

However, in such an SSD replacement process, the replacement SSD, similarly to SSD-#0, is an SSD in which the number of arranged parity blocks P is the largest within the SSD array 110-*. In such a case, the number of data write operations to the SSD in the SSD array 110-* is not in proportion to the number of parity blocks P in the SSD. That is, the number of data write operations to the SSD included in the SSD array 110-* does not correspond to the number of parity blocks P included in the SSD. Thus, for all the SSDs included in the SSD array 110-*, the order in which the number of data write operations to each SSD arrives at the upper limit cannot be controlled. Thus, in the embodiment, the drive replacement controller 25 (more specifically, the block rearrangement unit 250 of the drive replacement controller 25) rearranges the parity blocks P and the data blocks D0 to D5 through copying in the SSD array 110-* such that the replacement SSD is in a state in which the number of arranged parity blocks P is the smallest (specifically, a state in which the parity block P is not arranged).

FIG. 9 shows, in association with the array management tables 28 and 29, an example of the state after completion of the rearrangement of parity blocks P and data blocks D0 to D5 arranged as shown in FIG. 5 in block rearrangement applied to the embodiment. Here, the state of the management block boundary offset bdr_ofs, the drive member number, the parity blocks P, and the data blocks D0 to D6 before the rearrangement is also shown. In FIG. 9, description of "A→B" including symbol "→" represents that the state before rearrangement is A, and the state after rearrangement is B.

FIG. 9 is premised on a case in which SSD-#0 connected to a drive slot #0 is replaced, and the parity blocks P and the data blocks D0 to D5 are rearranged. In such block rearrangement, the block rearrangement unit 250, as shown in FIG. 9, increases the management block boundary offset bdr_ofs by one. From this, the location of a beginning stripe group of the management block is shifted by one in the direction in which the stripe group number increases, compared to the state before the rearrangement (see FIG. 5). In such a case, the beginning stripe group of the management block before the rearrangement is an ending stripe group of the management block after the rearrangement.

In addition, the block rearrangement unit 250 sets the drive member number of the replacement SSD (the replacement SSD may be denoted by SSD-#0 for convenience sake) that is newly connected to the drive slot #0 to 6. This is equivalent to a case where the drive member number of the replacement SSD (SSD-#0) changes from 0 to 6 as shown in FIG. 9. By allocating (changing) the drive member number, the replacement SSD (SSD-#0) is used as a drive in which the parity block P is not arranged.

Furthermore, the block rearrangement unit 250 decreases the drive member numbers 1 to 6 of SSD-#1 to SSD-#6 connected to drive slots #1 to #6 other than the drive slot #0 by one. That is, the block rearrangement unit 250 changes the drive member numbers of SSD-#1 to SSD-#6 from "1 to 6" to "0 to 5".

As described above, in the embodiment, the numbers of parity blocks P arranged in SSD-#0 to SSD-#6 in units of management blocks depend on the drive member numbers of SSD-#0 to SSD-#6. In a case where the drive member numbers of SSD-#1 to SSD-#6 are changed to 0 to 5 as described above, the parity blocks P and the data blocks D0 to D5 need to be rearranged such that the numbers of the parity blocks P arranged in SSD-#11 to SSD-#6 in units of management blocks are changed from "5 to 0" to "6 to 1". In addition, the parity blocks P and the data blocks D0 to D5 need to be rearranged such that the number of parity blocks P arranged, in units of management blocks, in a replacement SSD (SSD-#0) that is newly connected to the drive slot #0 is zero.

That is, in the embodiment, for the rearrangement of the parity blocks P and data blocks D0 to D5, the parity arrangement pattern is changed. However, when the location (that is, the location of the parity block P arranged in the beginning stripe group of the management block) that is a starting point of the parity arrangement pattern before change and the location that is a starting point of the parity arrangement pattern after change are used as references, the relative positional relation between both patterns coincides in all stripe groups within the management block. Accordingly, the parity arrangement pattern can be regarded as not being logically changed.

In the embodiment to which the above-described parity arrangement pattern is applied in units of management blocks, by changing the drive member numbers as described above, the rearrangement of the parity blocks P and data blocks D0 to D5 can be suppressed to a minimal level as described below. First, in the embodiment, the replacement SSD (SSD-#O0) is used as a drive in which the parity block P is not arranged. Accordingly, all the parity blocks P in the replacement SSD (SSD-#0) and the data blocks D0 to D6 in the stripe group including the parity blocks P may be rearranged.

Thus, the block rearrangement unit 250 rearranges the parity blocks P and the data blocks D0 to D5 only in stripe groups (hereinafter, referred to as rearrangement target stripe groups) including stripe blocks in which the parity blocks P are arranged in the replacement SSD (SSD-#0). The block rearrangement unit 250 performs this rearrangement in accordance with the above-described parity arrangement pattern (arrangement rule) in units of new management blocks after the management block boundary offset (bdr_ofs) is increased by one.

In the example shown in FIG. 9, the rearrangement target stripe groups include stripe groups having stripe group numbers of 0, 6, 11, 15, 18, 20, and 21. Such stripe groups correspond to the stripe groups including stripe blocks in which the parity blocks P are stored in the SSD (SSD-#0) before replacement. The block rearrangement unit 250 rearranges (copies) the parity blocks P (parity data) arranged (stored), within the stripe groups having stripe group numbers of 0, 6, 11, 15, 18, 20, and 21, in the SSD (SSD-#0) before replacement in SSD-#1, SSD-#6, SSD-#5, SSD-#4, SSD-#3, SSD-#2, and SSD-#1.

According to the embodiment, as shown in FIG. 9, while a minimum number of the parity blocks P and data blocks D0 to D5 are rearranged, the arrangement state of the parity blocks P and data blocks D0 to D5 according to the above-described parity arrangement pattern (arrangement rule) in units of new management blocks after an increase of one in the management block boundary offset (bdr_ofs) can be maintained. That is, according to the embodiment, the SSD array 110-* after the replacement of the SDD can be maintained in a state in which the parity block location, the data block locations, the access target data block, and the access target parity block can be calculated based on the flowcharts shown in FIGS. 6, 7, 8A, and 8B.

According to the parity arrangement pattern (arrangement rule) applied to the embodiment, in the SSD array 110-*, there is the only drive (SSD) in which the parity block P is not arranged. In addition, in the embodiment, the replacement SSD (SSD-#0) is used as a drive in which the parity block P is not arranged. Thus, according to the embodiment, stripe groups including stripe blocks, in the replacement SSD (SSD-#0), in which the parity blocks P are arranged can be simply specified as rearrangement target stripe groups. In addition, the block rearrangement after the replacement of the drive can be suppressed to a minimum level. Furthermore, according to the minimal block rearrangement, the regularity of the parity block location and the data block locations can be maintained. From this, the management of the parity block locations and the data block locations can be realized without using an arrangement location management table requiring a large capacity of the memory.

In addition, according to the embodiment, the parity block P is not arranged in the replacement SSD (SSD-#0), and the number of parity blocks P arranged in units of management blocks in the other SSD-#1 to SSD-#6 increases by one from "5 to 0" to "6 to 1". From this, according to the embodiment, for example, the order in the case of aligning SSD-#0 to SSD-#6 of the SSD array 110-* in the descending order of the numbers of write operations coincides with the order in the case of aligning SSD-#0 to SSD-#6 in the descending order of the number of the arranged parity blocks P even after the block rearrangement. That is, the relation of the numbers of data write operations to SSD-#0 to SSD-#6 coincides with the relation of the numbers of arranged parity blocks P in SSD-#0 to SSD-#6. Accordingly, in a case where the SSD array 110-* is continuously operated after the block rearrangement, the SSD 11-* of which the number of write operations arrives at the upper limit first can be maintained in the SSD in which the number of the arranged parity blocks P is the largest. From this, even after the block rearrangement, the state in which the numbers of write operations for a plurality of SSDs 11-* in the SSD array 110-* are close to the upper limit at the same time can be prevented from occurring.

However, even in the middle of the rearrangement of the parity blocks P and data blocks D0 to D6, a consistency relating to the calculation of the parity block location, the calculation of the data block locations, the specifying of an access target data block, and the specifying of an access target parity block need to be maintained. Accordingly, before the rearrangement of the parity blocks P and data blocks D0 to D6, the block rearrangement unit 250 copies the value of the management block boundary offset (bdr_ofs) to the PR block boundary offset (the management block boundary offset before rearrangement), and copies the drive member number to the PR member number (prior-rearrangement member number). That is, the block rearrangement unit 250 sets the PR block boundary offset to the management block boundary offset before block rearrangement and sets the PR member number to the drive member number before block rearrangement.

Then, while updating the R stripe group number (the stripe group number during rearrangement, that is, a stripe group number representing a stripe group during block rearrangement) in the ascending order of the stripe group numbers of all the rearrangement target stripe groups, the block rearrangement unit 250 rearranges the parity blocks P and the data blocks D0 to D6. That is, while updating the R stripe group number in order from the stripe group number of the beginning stripe group of all the rearrangement target stripe groups, the block rearrangement unit 250 performs block rearrangement for each rearrangement target stripe group.

The block rearrangement determination unit 26 determines, based on the R stripe group number, an area (hereinafter, referred to as a rearrangement-completed area) in which the block rearrangement in the SSD array 110-* has been completed and an area (hereinafter, referred to as a rearrangement not-completed area) in which the block rearrangement has not been completed. In addition, the block rearrangement determination unit 26 changes, based on a result of the determination, some parameter values used in the process according to the flowcharts shown in FIGS. 6, 7, 8A, and 8B for each determined area. Here, some parameter values described above are the parity block arrangement drive member number (pdrv_no), the data block arrangement drive member number (dblk_drv), and the management block boundary offset (bdr_ofs).

FIG. 10 shows an example of parameter value switching in a table form. In a case where the access target area is a rearrangement-completed area, a drive member number stored in the array management table 29 is used as the parity block arrangement drive member number (pdrv_no) and the data block arrangement drive member number (dblk_drv), and a management block boundary offset stored in the array management table 28 is used as the management block boundary offset (bdr_ofs). On the other hand, in a case where the access target area is a rearrangement not-completed area, a PR member number (a member number before rearrangement) stored in the array management table 29 is used as the parity block arrangement drive member number (pdrv_no) and the data block arrangement drive member number (dblk_drv), and a PR block boundary offset stored in the array management table 28 is used as the management block boundary offset (bdr_ofs).

During the block rearrangement, a rearrangement-completed area and a rearrangement not-completed area are generated in the SSD array 110-*. Accordingly, before starting the block rearrangement, the block rearrangement unit 250 stores a value of the management block boundary offset included in the array management table 28 before the start of the block rearrangement and a drive member number included in the array management table 29 before the start of the block rearrangement in the PR block boundary offset field of the array management table 28 and prior-rearrangement member number field of the array management table 29.

From this, even in a case where an access area designated by an access request from the host 2 is a rearrangement not-completed area, the block rearrangement determination unit 26 can specify an access target data block and an access target parity block. Here, a boundary between the rearrangement-completed area and a rearrangement not-completed area in the SSD array 110-* is specified based on the R stripe group number included in the array management table 28.

In the case of an access to a stripe group represented by the R stripe group number, the block rearrangement determination unit 26 determines that the block rearrangement is being performed for the stripe group. In such a case, the block rearrangement determination unit 26 notifies the array access controller 27 so as to hold the access requested from the host 2 until the block rearrangement is completed.

When the stripe group number of the stripe group (hereinafter, referred to as a target stripe group) in which the access target data block is present is less than the R stripe group number, the block rearrangement determination unit 26 determines the target stripe group as a rearrangement-completed area. On the other hand, when the stripe group number of the target stripe group is greater than the R stripe group number, the block rearrangement determination unit 26 determines the target stripe group as a rearrangement not-completed area. The block specifying unit 24 specifies an access target data block in the rearrangement-completed area or in the rearrangement not-completed area based on a result of the determination.

Figure 11:
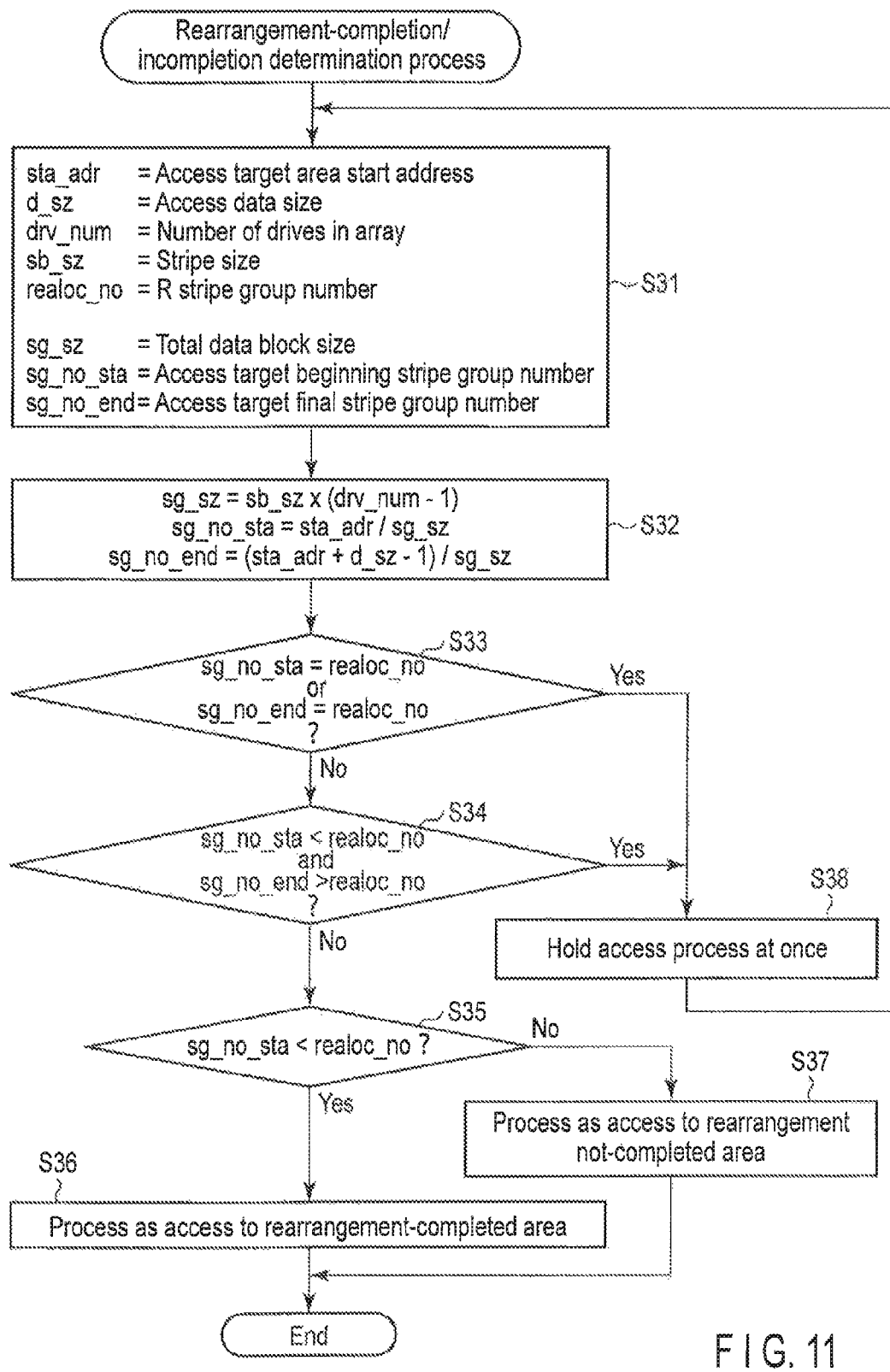
FIG. 11 is a flowchart illustrating an exemplary procedure of a rearrangement completion/rearrangement incompletion determination process applied to the embodiment.

Hereinafter, an exemplary procedure of the rearrangement completion/rearrangement incompletion determination process applied to the embodiment will be described with reference to a flowchart shown in FIG. 11. The rearrangement completion/rearrangement incompletion determination process is a process for determining whether the target stripe group is a rearrangement-completed area or a rearrangement not-completed area.

First, the block rearrangement determination unit 26 sets an access target area start address sta_adr, an access data size d_sz, the number of drives in array drv_num, a stripe size sb_sz, and an R stripe group number realoc_no in the work area of the local memory 126 (Step S31). In Step S31, the block specifying unit 24 defines a total block size sg_sz, an access target beginning stripe group number sg_no_sta, and an access target final stripe group number sg_no_end as variables. Such variables are set within the work area. The access target beginning stripe group number sg_no_sta represents a stripe group number of a stripe group to which a starting end of the access target area requested from the host 2 belongs. The access target final stripe group number sg_no_end represents a stripe group number of a stripe group to which a final end of the access target area belongs.

Next, the block rearrangement determination unit 26 calculates a total data block size sg_sz (Step S32). The calculation of the total data block size sg_sz, which is performed by the block rearrangement determination unit 26, is performed similarly to the case (Step S21) where the total data block size sg_sz is calculated by the block specifying unit 24.

In Step S32, the block rearrangement determination unit 26 calculates an access target beginning stripe group number sg_no_sta based on the access target area start address sta_adr and the total data block size sg_sz using the following equation.

sg_no_sta=sta_adr/sg_sz

In addition, in Step S32, the block rearrangement determination unit 26 calculates an access target final stripe group number sg_no_end based on the access target area start address sta_adr, the access data size d_sz, and the total data block size sg_sz using the following equation.

sg_no_end=(sta_adr+d_sz−1)/sg_sz

Next, the block rearrangement determination unit 26 determines whether the access target beginning stripe group number sg_no_sta or the access target final stripe group number sg_no_end is equal to the R stripe group number realoc_no (Step S33). If the determination of Step S33 is "No", the block rearrangement determination unit 26 proceeds to Step S34.

In Step S34, the block rearrangement determination unit 26 determines whether the access target beginning stripe group number sg_no_sta is less than the R stripe group number realoc_no, and the access target final stripe group number sg_no_end is more than the R stripe group number realoc_no. If the determination of Step S34 is "No", the block rearrangement determination unit 26 proceeds to Step S35.

In Step S35, the block rearrangement determination unit 26 determines whether the access target beginning stripe group number sg_no_sta is less than the R stripe group number realoc_no. Here, it is assumed that the determination of Step S35 is "Yes". That is, it is assumed that the access target beginning stripe group number sg_no_sta is less than the R stripe group number realoc_no, and the access target final stripe group number sg_no_end is not more than the R stripe group number realoc_no. In such a case, the block rearrangement determination unit 26 determines that the access target area is a rearrangement-completed area. Then, the block specifying unit 24 processes the access request from the host 2 as an access to a rearrangement-completed area and specifies an access target data block in the rearrangement-completed area (Step S36). From this, the array access controller 27 accesses the specified access target data block.

In contrast to this, it is assumed that the determination of Step S35 is "No". That is, it is assumed that the access target beginning stripe group number sg_no_sta is more than the R stripe group number realoc_no. In such a case, the block rearrangement determination unit 26 determines that the access target area is a rearrangement not-completed area. Then, the block specifying unit 24 processes the access request from the host 2 as an access to a rearrangement not-completed area and specifies an access target data block in the rearrangement not-completed area (Step S37). From this, the array access controller 27 accesses the specified access target data block.

On the other hand, it is assumed that the determination of Step S33 is "Yes". That is, it is assumed that the access target beginning stripe group number sg_no_sta or the access target final stripe group number sg_no_end is equal to the R stripe group number realoc_no. In such a case, the block rearrangement determination unit 26 determines that an area during the block rearrangement is included in the access target area and proceeds to Step S38.

Next, it is assumed that the determination of Step S34 is "Yes". That is, it is assumed that the access target beginning stripe group number sg_no_sta is less than the R stripe group number realoc_no, and the access target final stripe group number sg_no_end is more than the R stripe group number realoc_no. Also in such a case, the block rearrangement determination unit 26 determines that an area during the block rearrangement is included in the access target area and proceeds to Step S38.

In Step S38, since an area during the block rearrangement is included in the access target area, the block rearrangement determination unit 26 notifies the array access controller 27 to hold the access requested from the host 2. Then, the block rearrangement determination unit 26 returns the process to Step S31.

According to the embodiment, the locations of the parity blocks P and data blocks D0 to D6 in the SSD array 110-* are managed based on a predetermined parity arrangement pattern (arrangement rule) in units of management blocks comprising a plurality of continuous stripe groups. Thus, according to the embodiment, a mapping table does not need to be used for managing the locations of the parity blocks P and data blocks D0 to D6 in the SSD array 110-*, and the management thereof can be realized using a small amount of memory capacity.

In addition, according to the embodiment, the block rearrangement is performed only in a case where an SSD for which the number of write operations arrives at the upper limit out of a plurality of SSDs (more specifically, SSD-#0 to SSD-#6) configuring the SSD array 110-* is replaced. Accordingly, an increase in the number of data write operations to each SSD due to the block rearrangement can be suppressed to a minimum level.

[Modification]

Next, a modification of the embodiment will be described. A feature of the modification is that automatic SSD replacement is realized using a hot spare SSD. First, in the embodiment, an overview of block rearrangement executed by the block rearrangement unit 250 will be described as below. As described above, the block rearrangement unit 250 increases the management block boundary offset (bdr_ofs) by one in the block rearrangement. In addition, the block rearrangement unit 250 sets the drive member number of the replacement SSD (SSD-#0) to six, thereby defining the replacement SSD (SSD-#0) as a drive in which the parity block P is not arranged. Furthermore, the block rearrangement unit 250 increases the drive member number of the other SSDs (SSD-#1 to SSD-#6) by one. Then, the block rearrangement unit 250 rearranges the parity blocks P and the data blocks D0 to D6 based on the management block boundary offset (bdr_ofs) and the drive member number only for stripe groups (rearrangement target stripe group), in the replacement SSD (SSD-#0), including stripe blocks in which the parity blocks P are arranged.

The block rearrangement unit 250 registers, as the R stripe group number (a stripe group number during parity rearrangement), the stripe group number of a stripe group from which the block rearrangement is started reloc_no. Then, the block rearrangement unit 250 executes the block rearrangement while registering, as the R drive slot number (a drive slot number during parity rearrangement), the drive slot number of the SSD 11-* in which the current rearrangement target block (the parity block P or the data block Dj) is present.

In the embodiment, a hot spare SSD (hereinafter, referred to as an SSD-SP) is connected to the drive slot #7. For example, in a case where SSD-#0 is replaced in this state, the drive replacement controller 25 saves all the data of SSD-#0 to the SSD-SP (that is, the hot spare SSD allocated to the SSD array 110-*). After the saving of the data, when SSD-#0 is replaced with another SSD, the drive replacement controller 25 rewrites the data of the SSD-SP to the other SSD (that is, the replacement SSD). Then, the block rearrangement unit 250 executes the above-described block rearrangement. Here, the block rearrangement unit 250 may be independent from the drive replacement controller 25.

FIG. 12 shows, in association with array management tables 28 and 29, an example of the state in the middle of the rearrangement of parity blocks P and the data blocks D0 to D5 arranged as shown in FIG. 5 in the block rearrangement applied to the embodiment. In this way, FIG. 12 shows the state in the middle of the block rearrangement, which is different from FIG. 9 showing the state after the completion of the block rearrangement. In addition, FIG. 12 shows the state of the SSD-SP, which is not shown in FIG. 9.

In the example shown in FIG. 12, it is assumed that block rearrangement is executed for a stripe group having a stripe group number of 28. That is, it is assumed that the block rearrangement has been completed up to the stripe group having a stripe group number of 27. The drive member number and the PR member number (prior-rearrangement member number) of the SSD-SP are the same as those of the replacement SSD (SSD-#0).

As is apparent from FIG. 12, when the data of the SSD-SP is included, in the SSD array 110-*, only one set of stripe blocks having the same data is present in the same stripe group. That is, there is one set of the stripe blocks arranged in the replacement SSD (SSD-#0) and the stripe blocks arranged in the SSD-SP. The block rearrangement unit 250 executes the block rearrangement using the stripe blocks.

Here, it is assumed that the block rearrangement is interrupted due to cut-off of the power of the storage device 1 in the middle of the block rearrangement process. Then, the power is assumed to be restored, whereby the storage device 1 is restarted. In such a case, the block rearrangement unit 250 resumes the block rearrangement from the state in which the block rearrangement is interrupted. In order to reliably resume the block rearrangement, the block rearrangement unit 250 executes the block rearrangement while storing at least the R stripe group number and the R drive slot number in a non-volatile storage such as a flash memory or a hard disk drive.

In the modification, the drive replacement controller 25 builds the SSD-SP into the SSD array 110-* as a replacement SSD, thereby realizing automatic SSD replacement. Hereinafter, this automatic SSD replacement will be described.

Now, similarly to the embodiment, the number of data write operations to SSD-#0 is assumed to arrive at the upper limit. In this case, the drive replacement controller 25 allocates the SSD-SP to the SSD array 110-* and copies (saves) all the data of SSD-#0 to the SSD-SP. Then, the drive replacement controller 25 excludes SSD-#0 (that is, SSD-#0 for which the number of write operations arrives at the upper limit) from the SSD array 110-* and regards the SSD-SP as the replacement SSD (new SSD-#0). In this state, the block rearrangement unit 250, similarly to the embodiment, executes block rearrangement. A difference from the embodiment is that the replacement SSD (SSD-#0) is the SSD-SP (hereinafter, referred to as a first SSD-SP) that is connected to the drive slot #7.

When the block rearrangement is started, the block rearrangement unit 250 changes the drive member number of SSD-#0 for which the number of write operations arrives at the upper limit from 0 to 6. In addition, the block rearrangement unit 250 sets the drive member number of the first SSD-SP regarded as the replacement SSD to 6. The block rearrangement unit 250 decreases the drive member numbers 1 to 6 of the other SSD-#1 to SSD-#6 by one. In FIG. 12, the drive member numbers after change are described.

After the block rearrangement is completed, the drive replacement controller 25 newly redefines, as a hot spare SSD (SSD-SP), SSD-#0 (that is, the SSD 11-0) for which the number of write operations arrives at the upper limit. More specifically, the attribute of SSD-#0 (that is, the SSD 11-0) is changed from the SSD (SSD-#0) used in the SSD array 110-0 to the hot spare SSD. Here, SSD-#0 after the attribute change is represented as an SSD-SP (specifically, a second SSD-SP). The drive replacement controller 25 handles the second SSD-SP as a failed drive due to arriving at the upper limit of the number of write operations. From this, the drive replacement controller 25 separates the second SSD-SP (that is, the SSD 11-0) from the SSD array 110-*.

In addition, when the block rearrangement is executed, the drive replacement controller 25 defines the first SSD-SP allocated to the SSD array 110-* as an SSD used for the SSD array 110-* instead of SSD-#0 (SSD 11-0) for which the number of write operations arrives at the upper limit. More specifically, the attribute of the first SSD-SP is changed from the SSD-SP (hot spare SSD) to an SSD used for the SSD array 110-*. The first SSD-SP after the attribute change is represented as SSD-#0 for convenience sake.

In the modification, the attributes of SSD-#0 (that is, SSD-#0 for which the number of write operations arrives at the upper limit) and the SSD-SP are changed as described above. Accordingly, the block rearrangement unit 250 performs block rearrangement for the SSD having the attribute change from the SSD-SP to SSD-#0 and having the drive member number set to 6 and the drives SSD-#1 to SSD-#6 having the drive member numbers being changed from "1 to 6" to "0 to 5". According to the modification, differently from the embodiment, SSD-#0 for which the number of write operations arrives at the upper limit does not need to be replaced with another SSD (replacement SSD) for the block rearrangement. That is, according to the modification, automatic SSD replacement can be realized using the SSD-SP that is in the standby state.

FIG. 13 shows, in association with the array management tables 28 and 29, an example of the state after the completion of the rearrangement of the parity blocks P and data blocks D0 to D5 arranged as shown in FIG. 5 in the block rearrangement applied to the modification. Here, the state of the management block boundary offset (bdr_ofs), the parity blocks P, and the data blocks D0 to D6 before the rearrangement is also shown.

According to at least one embodiment described above, a storage apparatus, a storage controller, and a method capable of managing the locations of error correcting code blocks in an array in a simple manner are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
a group of solid state drives including a plurality of solid state drives each comprising a first storage area divided into a plurality of stripe blocks; and
a storage controller configured to control the group of the solid state drives,
wherein
the storage controller comprises an array management unit configured to manage an array comprising a second storage area divided into a plurality of stripe groups, a set of an error correcting code block used for storing an error correcting code and a plurality of data blocks used for storing data being arranged in each of the plurality of stripe groups, and each of the plurality of stripe groups comprising a set of the stripe blocks of which physical positions correspond to each other in the plurality of solid state drives, and
the array management unit is configured to regularly arrange the error correcting code blocks and the data blocks in the plurality of stripe groups based on a predetermined arrangement rule such that the numbers of the arranged error correcting code blocks are non-uniform among the plurality of solid state drives and to manage locations of the error correcting code blocks based on the arrangement rule.

2. The storage apparatus of claim 1, wherein the array management unit is further configured to arrange the error correcting code blocks and the data blocks in units of management blocks that are sets of a predetermined number of the stripe groups having continuous physical positions such that the numbers of arranged error correcting code blocks are non-uniform among the plurality of solid state drives.

3. The storage apparatus of claim 2, wherein the storage controller further comprises a block specifying unit configured to specify locations of a first data block and a first parity block based on the arrangement rule when accesses to the first data block and the first parity block are necessary.

4. The storage apparatus of claim 2, wherein:
the array management unit is further configured to arrange the error correcting code blocks in the plurality of solid state drives, except one of the plurality of solid state drives; and
the storage controller further comprises
a drive replacement controller configured to monitor the numbers of write operations for the plurality of solid state drives and to control replacement of a first solid state drive for which the number of write operations arrives at a predetermined upper limit with a second solid state drive, and
a block rearrangement unit configured to rearrange the error correcting code blocks arranged in the first solid state drive to the other solid state drives excluding the second solid state drive from the plurality of solid state drives after the replacement.

5. The storage apparatus of claim 4, wherein the block rearrangement unit is further configured to rearrange the error correcting code blocks arranged in the first solid state drive such that relation of the numbers of the error correcting code blocks arranged in the other solid state drives before the rearrangement is maintained after the rearrangement.

6. The storage apparatus of claim 5, wherein the block rearrangement unit is further configured to shift start points of the management blocks by one stripe group when the rearrangement is started and to rearrange the error correcting code blocks such that each of first numbers of the error correcting code blocks arranged in the other solid state drives in units of the management blocks increases by one from that before the rearrangement.

7. The storage apparatus of claim 6, wherein:
the array management unit is further configured to allocate drive member numbers having values corresponding to the number of the error correcting code blocks arranged in the plurality of solid state drives in units of the management blocks to the plurality of solid state drives; and
the block rearrangement unit is further configured to change the drive member numbers allocated to the other solid state drives to values corresponding to the first numbers increased by one and to set the drive member number allocated to the second solid state drive to a value corresponding to a case where a second number of the error correcting code blocks arranged in the second solid state drive in units of the management blocks is zero when the rearrangement is performed.

8. The storage apparatus of claim 1, wherein the storage controller further comprises a block specifying unit configured to specify locations of a first data block and a first parity block based on the arrangement rule when accesses to the first data block and the first parity block are necessary.

9. A storage controller configured to control a group of solid state drives including a plurality of solid state drives each comprising a first storage area divided into a plurality of stripe blocks, the storage controller comprising:
an array management unit configured to manage an array comprising a second storage area divided into a plurality of stripe groups, a set of an error correcting code block used for storing an error correcting code and a plurality of data blocks used for storing data being arranged in each of the plurality of stripe groups, and each of the plurality of stripe groups comprising a set of the stripe blocks of which physical positions correspond to each other in the plurality of solid state drives,
wherein the array management unit is configured to regularly arrange the error correcting code blocks and the data blocks in the plurality of stripe groups based on a predetermined arrangement rule such that the numbers of the arranged error correcting code blocks are non-uniform among the plurality of solid state drives and to manage locations of the error correcting code blocks based on the arrangement rule.

10. The storage controller of claim 9, wherein the array management unit is further configured to arrange the error correcting code blocks and the data blocks in units of management blocks that are sets of a predetermined number of the stripe groups having continuous physical positions such that the numbers of arranged error correcting code blocks are non-uniform among the plurality of solid state drives.

11. The storage controller of claim 10, further comprising a block specifying unit configured to specify locations of a first data block and a first parity block based on the arrangement rule when accesses to the first data block and the first parity block are necessary.

12. The storage controller of claim 10, wherein:
the array management unit is further configured to arrange the error correcting code blocks in the plurality of solid state drives, except one of the plurality of solid state drives; and
the storage controller further comprises
a drive replacement controller configured to monitor the numbers of write operations for the plurality of solid state drives and to control replacement of a first solid state drive for which the number of write operations arrives at a predetermined upper limit with a second solid state drive, and a block rearrangement unit configured to rearrange the error correcting code blocks arranged in the first solid state drive to the other solid state drives excluding the second solid state drive from the plurality of solid state drives after the replacement.

13. The storage controller of claim 12, wherein the block rearrangement unit is further configured to rearrange the error correcting code blocks arranged in the first solid state drive such that relation of the numbers of the error correcting code blocks arranged in the other solid state drives before the rearrangement is maintained after the rearrangement.

14. The storage controller of claim 13, wherein the block rearrangement unit is further configured to shift start points of the management blocks by one stripe group when the rearrangement is started and to rearrange the error correcting code blocks such that each of first numbers of the error correcting code blocks arranged in the other solid state drives in units of the management blocks increases by one from that before the rearrangement.

15. The storage controller of claim 14, wherein:
the array management unit is further configured to allocate drive member numbers having values corresponding to the number of the error correcting code blocks arranged in the plurality of solid state drives in units of the management blocks to the plurality of solid state drives; and
the block rearrangement unit is further configured to change the drive member numbers allocated to the other solid state drives to values corresponding to the first numbers increased by one and to set the drive member number allocated to the second solid state drive to a value corresponding to a case where a second number of the error correcting code blocks arranged in the second solid state drive in units of the management blocks is zero when the rearrangement is performed.

16. A method, implemented in a storage controller, for managing locations of error correcting code blocks in an array, the storage controller being configured to control a group of solid state drives including a plurality of solid state drives, each of the plurality of solid state drives comprising a first storage area divided into a plurality of stripe blocks, the array comprising a second storage area divided into a plurality of stripe groups, a set of an error correcting code block used for storing an error correcting code and a plurality of data blocks used for storing data being arranged in each of the plurality of stripe groups, and each of the plurality of stripe groups comprising a set of the stripe blocks of which physical positions correspond to each other in the plurality of solid state drives, the method comprising:
regularly arranging the error correcting code blocks and the data blocks in the plurality of stripe groups based on a predetermined arrangement rule such that the numbers of the arranged error correcting code blocks are non-uniform among the plurality of solid state drives configuring the array when the array is generated; and
managing locations of the error correcting code blocks based on the arrangement rule.

17. The method of claim 16, wherein the error correcting code blocks and the data blocks are arranged in units of management blocks that are sets of a predetermined number of the stripe groups having continuous physical positions such that the numbers of arranged error correcting code blocks are non-uniform among the plurality of solid state drives.

18. The method of claim 17, further comprising specifying locations of a first data block and a first parity block based on the arrangement rule when accesses to the first data block and the first parity block are necessary.

19. The method of claim 17, wherein:
the error correcting code blocks are arranged in the plurality of solid state drives, except one of the plurality of solid state drives; and
the method further comprises
monitoring the numbers of write operations for the plurality of solid state drives,
controlling replacement of a first solid state drive for which the number of write operations arrives at a predetermined upper limit with a second solid state drive, and
rearranging the error correcting code blocks arranged in the first solid state drive to the other solid state drives excluding the second solid state drive from the plurality of solid state drives after the replacement.

20. The method of claim 19, wherein the error correcting code blocks arranged in the first solid state drive are rearranged such that a relation of the numbers of the error correcting code blocks arranged in the other solid state drives before the rearrangement is maintained after the rearrangement.

* * * * *